(12) United States Patent
Yokoyama et al.

(10) Patent No.: US 10,916,123 B2
(45) Date of Patent: Feb. 9, 2021

(54) CONTROL SYSTEM, CONTROL APPARATUS, AND CONTROL METHOD

(71) Applicants: SONY CORPORATION, Tokyo (JP); SONY MOBILE COMMNUNICATIONS INC., Tokyo (JP)

(72) Inventors: Ryo Yokoyama, Tokyo (JP); Akira Ono, Kanagawa (JP); Mikio Takenaka, Kanagawa (JP); Ryosuke Murakami, Tokyo (JP); Hideaki Hayashi, Aichi (JP); Mioko Ambe, Tokyo (JP); Ryosuke Takeuchi, Saitama (JP); Kazutoshi Ohno, Kanagawa (JP); Seiji Muramatsu, Saitama (JP); Tetsuya Naruse, Kanagawa (JP); Tetsuya Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/326,061

(22) PCT Filed: Jun. 26, 2017

(86) PCT No.: PCT/JP2017/023327
§ 371 (c)(1),
(2) Date: Feb. 15, 2019

(87) PCT Pub. No.: WO2018/037699
PCT Pub. Date: Mar. 1, 2018

(65) Prior Publication Data
US 2019/0180607 A1   Jun. 13, 2019

(30) Foreign Application Priority Data
Aug. 23, 2016 (JP) .................. 2016-163020

(51) Int. Cl.
*G08C 17/00* (2006.01)
*H04Q 9/00* (2006.01)
(Continued)

(52) U.S. Cl.
CPC ............. *G08C 17/00* (2013.01); *G06F 3/016* (2013.01); *G06F 3/017* (2013.01); *G06F 3/0346* (2013.01);
(Continued)

(58) Field of Classification Search
CPC ........ G08C 17/00; G08C 17/02; G08C 23/04; G06F 3/016; G06F 3/017; G06F 3/0346; H04N 5/4403; H04N 21/42222
See application file for complete search history.

(56) References Cited

U.S. PATENT DOCUMENTS

2006/0066569 A1   3/2006   Eid et al.
2013/0147611 A1   6/2013   Brendel
(Continued)

FOREIGN PATENT DOCUMENTS

EP   2 779 672   9/2014
EP   3 007 030   4/2016
(Continued)

OTHER PUBLICATIONS

International Search Report and Written Opinion issued in connection with International Patent Application No. PCT/JP2017/023327, dated Sep. 12, 2017. (11 pages).
(Continued)

*Primary Examiner* — Nabil H Syed
(74) *Attorney, Agent, or Firm* — K&L Gates LLP

(57) ABSTRACT

A control system according to the present technology includes a control apparatus and a control-subject apparatus. The control-subject apparatus includes a first execution unit and a first output unit. The first execution unit performs a
(Continued)

predetermined operation in response to a control signal output from the control apparatus. The first output unit outputs a tactile-sensation-related information item relating to the predetermined operation. The control apparatus includes a detection unit, a second output unit, and a second execution unit. The detection unit detects a state of the control apparatus. The second output unit outputs the control signal corresponding to the detected state. The second execution unit performs, on the basis of the tactile-sensation-related information item output from the first output unit, a tactile-sensation presentation operation for presenting a tactile sensation.

16 Claims, 14 Drawing Sheets

(51) Int. Cl.
| | | |
|---|---|---|
| *G06F 3/01* | (2006.01) | |
| *G06F 3/0346* | (2013.01) | |
| *H04N 21/422* | (2011.01) | |
| *G08C 17/02* | (2006.01) | |
| *G08C 23/04* | (2006.01) | |
| *G08B 6/00* | (2006.01) | |

(52) U.S. Cl.
CPC ............... *G08B 6/00* (2013.01); *G08C 17/02* (2013.01); *G08C 23/04* (2013.01); *H04N 21/42204* (2013.01); *H04N 21/42222* (2013.01); *H04Q 9/00* (2013.01); *G08C 2201/32* (2013.01); *G08C 2201/50* (2013.01)

(56) References Cited

U.S. PATENT DOCUMENTS

| | | | |
|---|---|---|---|
| 2014/0267911 A1* | 9/2014 | Grant | ............... H04N 21/42201 348/563 |
| 2015/0130706 A1 | 5/2015 | Lacroix et al. | |
| 2015/0248161 A1 | 9/2015 | Komori et al. | |
| 2015/0346834 A1* | 12/2015 | Martinez Fernandez | .................... G06F 3/017 340/12.5 |
| 2017/0255263 A1* | 9/2017 | Letendre | ................. G06F 3/016 |

FOREIGN PATENT DOCUMENTS

| | | |
|---|---|---|
| JP | 2005-317165 | 11/2005 |
| JP | 2005-317165 A | 11/2005 |
| JP | 2006-246287 | 9/2006 |
| JP | 2006-246287 A | 9/2006 |
| JP | 2007-142513 | 6/2007 |
| JP | 2009-021644 | 1/2009 |
| JP | 2009-021644 A | 1/2009 |
| JP | 2013-536660 | 9/2013 |
| JP | 2013-536660 A | 9/2013 |
| JP | 2015-095264 | 5/2015 |
| JP | 2015-095264 A | 5/2015 |
| JP | 2015-166890 | 9/2015 |
| JP | 2015-166890 A | 9/2019 |

OTHER PUBLICATIONS

Extended European Search Report dated Jul. 24, 2019 in corresponding European Application No. 17843187.0.

* cited by examiner

CONTROL SYSTEM, CONTROL APPARATUS, AND CONTROL METHOD

CROSS-REFERENCE TO RELATED APPLICATIONS

The present application claims the benefit of International Application No. PCT/JP2017/023327, filed Jun. 26, 2017, which claims priority to Japanese Application No. 2016-163020, filed Aug. 23, 2016, the disclosures of which are incorporated herein by reference.

BACKGROUND

The present technology relates to a control system, a control apparatus, and a control method that are applicable, for example, to apparatus control with use of a remote controller.

Technologies for controlling apparatuses such as a television apparatus with use of, for example, an infrared remote controller have been widely known. Japanese Patent Application Laid-open No. 2007142513 describes apparatus control with a remote controller including a gyroscopic sensor and an acceleration sensor. When the gyroscopic sensor or the like detects a motion of the remote controller, television channels can be switched in response thereto. In this way, operability for users is increased.

SUMMARY

Technical Problem

Technologies for enabling high operability to be exerted in the apparatus remote control with use of, for example, the remote controller in this way have been demanded.

In view of such circumstances, the present technology has been made to achieve an object to provide a control system, a control apparatus, and a control method that enable remote control with high operability.

Solution to Problem

In order to achieve the above-mentioned object, according to an embodiment of the present technology, there is provided a control system including a control apparatus and a control-subject apparatus.

The control-subject apparatus includes a first execution unit and a first output unit.

The first execution unit performs a predetermined operation in response to a control signal output from the control apparatus.

The first output unit outputs a tactile-sensation-related information item relating to the predetermined operation.

The control apparatus includes a detection unit, a second output unit, and a second execution unit.

The detection unit detects a state of the control apparatus.

The second output unit outputs the control signal corresponding to the detected state.

The second execution unit performs, on the basis of the tactile-sensation-related information item output from the first output unit, a tactile-sensation presentation operation for presenting a tactile sensation.

In this control system, the control signal corresponding to the state of the control apparatus is output by the control apparatus. Then, the tactile-sensation-related information item relating to the predetermined operation is output in response to the control signal by the control-subject apparatus. After the control apparatus receives the tactile-sensation-related information item, the control apparatus performs the tactile-sensation presentation operation on the basis of the tactile-sensation-related information item. With this, a user who operates the control apparatus can remote-control the control-subject apparatus on the basis of the tactile sensation to be presented. Thus, high operability is exerted.

The state of the control apparatus may include at least one of
 a position,
 an orientation,
 a posture, or
 a motion of the control apparatus.

With this, the user can remote-control the control-subject apparatus, for example, by moving the control apparatus. Thus, high operability can be exerted.

The first output unit may output, as the tactile-sensation-related information item, a result of the predetermined operation that is performed by the control-subject apparatus.

In this case, the second execution unit may perform the tactile-sensation presentation operation for presenting the tactile sensation that corresponds to the output result of the predetermined operation.

With this, the operation result of the control-subject apparatus can be tactilely grasped. Thus, high operability can be exerted.

The first output unit may output a presentation timing of the tactile sensation as the tactile-sensation-related information item.

In this case, the second execution unit may perform the tactile-sensation presentation operation on the basis of the output presentation timing.

With this, for example, an appropriate control timing for remote-controlling the control-subject apparatus can be grasped. Thus, high operability can be exerted.

The first output unit may output, as the tactile-sensation-related information item, a pattern of the tactile sensation to be presented.

In this case, the second execution unit may perform the tactile-sensation presentation operation on the basis of the output pattern of the tactile sensation.

With this, the tactile sensation that corresponds to the operation of the control-subject apparatus can be easily presented.

The first output unit may output, as the tactile-sensation-related information item, a presentation condition of the tactile sensation, the presentation condition relating to the state of the control apparatus.

In this case, the second execution unit may perform the tactile-sensation presentation operation on the basis of the output presentation condition of the tactile sensation.

With this, for example, the tactile sensation that corresponds to the state of the control apparatus can be easily presented. Thus, high operability can be exerted.

The first execution unit may perform volume control in response to the control signal.

In this case, the first output unit may output the tactile-sensation-related information item that corresponds to the volume control.

With this, the volume control can be performed with high operability.

The first execution unit may perform reproduction control with respect to a content item in response to the control signal.

In this case, the first output unit may output the tactile-sensation-related information item that corresponds to the reproduction control.

With this, the reproduction control with respect to the content item can be performed with high operability.

The first execution unit may perform reproduction point selection with respect to a content item in response to the control signal.

In this case, the first output unit may output the tactile-sensation-related information item that corresponds to the reproduction point selection.

With this, the reproduction point selection can be performed with high operability.

The first execution unit may perform reproduction point selection with respect to a content item in response to the control signal.

In this case, the first output unit may output the tactile-sensation-related information item that corresponds to an excitement level in the content item.

With this, the reproduction point selection that corresponds to the excitement level can be performed with high operability.

The first execution unit may perform selection of a deletion-target data item in response to the control signal.

In this case, the first output unit may output the tactile-sensation-related information item that corresponds to an importance of the selected deletion-target data item.

With this, the data item can be deleted with high operability.

The second execution unit may determine, on the basis of the detected state, the tactile sensation to be presented.

With this, the tactile sensation can be presented with high accuracy.

The execution unit may cause, as the tactile-sensation presentation operation, the control-subject apparatus to vibrate.

By causing the control apparatus to vibrate, for example, the operation result of the control-subject apparatus can be grasped. With this, the remote control can be performed with high operability.

The execution unit may change, as the tactile-sensation presentation operation, at least one of
a temperature,
a shape, or
hardness of the control-subject apparatus.

By changing the temperature, the shape, or the hardness of the control apparatus, the remote control can be performed with high operability.

According to another embodiment of the present technology, there is provided a control apparatus that is capable of controlling a control-subject apparatus. The control apparatus includes a detection unit, an output unit, a reception unit, and an execution unit.

The detection unit detects a state of the control apparatus.

The output unit outputs a control signal corresponding to the detected state.

The reception unit receives a tactile-sensation-related information item relating to a predetermined operation that the control-subject apparatus performs in response to the output control signal, the tactile-sensation-related information item being output from the control-subject apparatus.

The execution unit performs, on the basis of the received tactile-sensation-related information item, a tactile-sensation presentation operation for presenting a tactile sensation.

According to still another embodiment of the present technology, there is provided a control system including a control apparatus, and a control-subject apparatus.

The control-subject apparatus includes a detection unit, a first execution unit, and an output unit.

The detection unit detects a state of the control apparatus.

The first execution unit performs a predetermined operation on the basis of the detected state.

The output unit outputs a tactile-sensation-related information item relating to the predetermined operation.

The control apparatus includes a second execution unit.

The second execution unit performs, on the basis of the tactile-sensation-related information item output from the output unit, a tactile-sensation presentation operation for presenting a tactile sensation.

A control method according to yet another embodiment of the present technology is a control method that is carried out by a control apparatus and a control-subject apparatus, and the control method includes outputting, by the control apparatus, a control signal corresponding to a state of the control apparatus.

By the control-subject apparatus, a predetermined operation is performed in response to the control signal output from the control apparatus.

By the control-subject apparatus, a tactile-sensation-related information item relating to the predetermined operation is output.

By the control apparatus, a tactile-sensation presentation operation for presenting a tactile sensation is performed on the basis of the tactile-sensation-related information item output from the control-subject apparatus.

A control method according to yet another embodiment of the present technology is a control method that is carried out by a control apparatus and a control-subject apparatus, and the control method includes detecting, by the control-subject apparatus, a state of the control apparatus, and performing, by the control-subject apparatus, a predetermined operation on the basis of the detected state.

By the control-subject apparatus, a tactile-sensation-related information item relating to the predetermined operation is output.

By the control apparatus, a tactile-sensation presentation operation for presenting a tactile sensation is performed on the basis of the tactile-sensation-related information item output from the control-subject apparatus.

Advantageous Effects of Invention

As described above, according to the present technology, remote control with high operability can be performed. Note that, the advantages disclosed herein are not necessarily limited to those described hereinabove, and all the advantages described hereinabove and hereinbelow can be obtained.

DETAILED DESCRIPTION

Now, embodiments of the present technology are described with reference to the drawings.

First Embodiment

[Configuration of Remote-Operation Control System]

Figure 1:
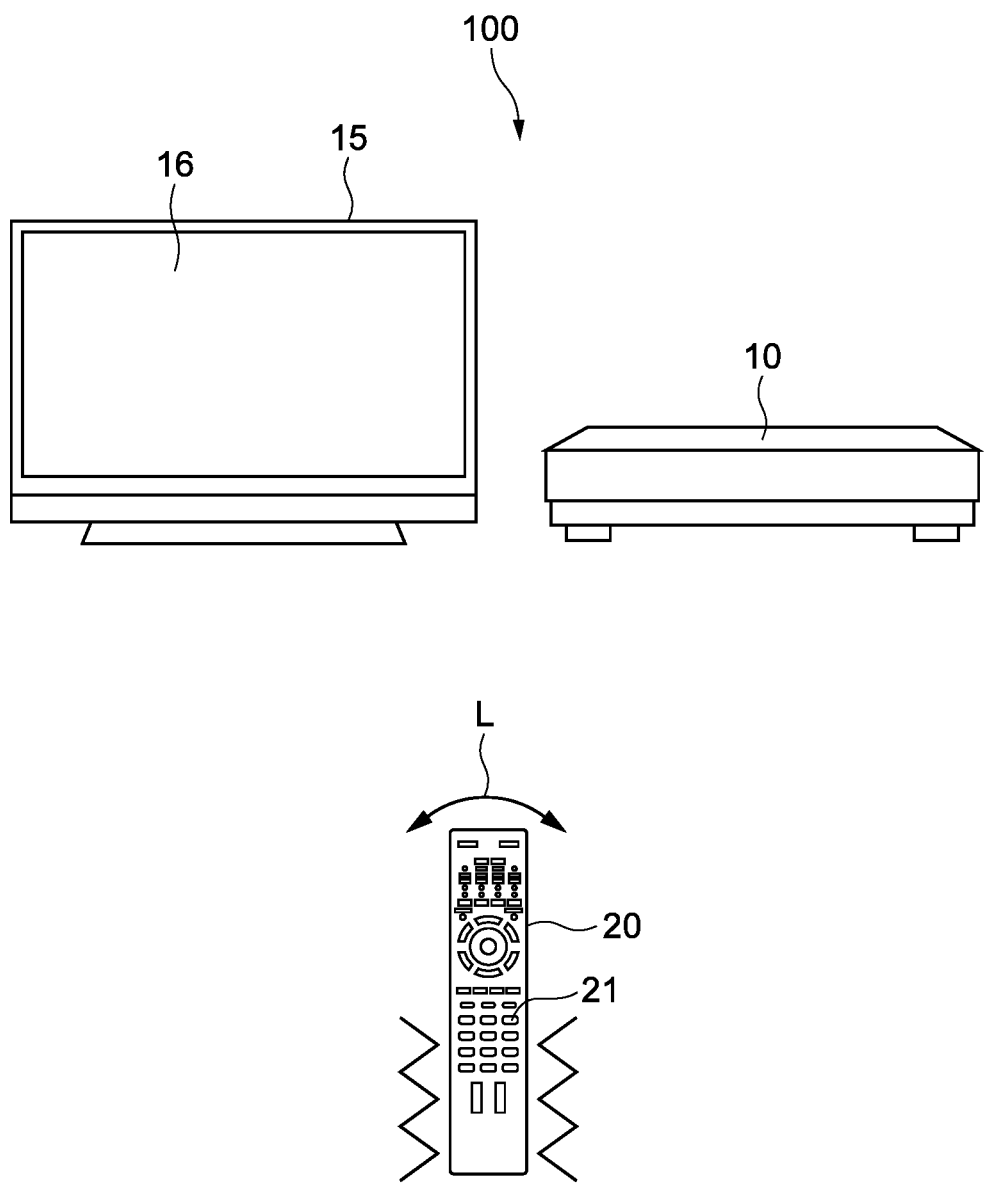
FIG. 1 A schematic view illustrating a configuration example of a remote-operation control system according to a first embodiment.

FIG. 1 is a schematic view illustrating a configuration example of a remote-operation control system (hereinafter, abbreviated as "control system") according to a first embodiment of the present technology. A control system 100 includes a BD (Blu-ray (trademark) Disc) recorder 10 as a control-subject apparatus, and a remote controller 20 as a control apparatus.

The BD recorder 10 is connected to a television apparatus 15 via, for example, an HDMI (trademark) (High-Definition Multimedia Interface) cable. The BD recorder 10 is capable of recording/reproducing program content items that are transmitted from broadcasters. Further, the BD recorder 10 is also capable of loading and reproducing content items stored in BDs or DVDs. The program content items and the like to be reproduced are displayed on a screen 16 of the television apparatus 15.

The BD recorder 10 is capable of exerting various functions such as reproduction control including fast-forward and rewind, reproduction point selection including chapter selection, control of volume to be output from the television apparatus 15, setting of recording reservation, and deletion of recorded program-content items. As a matter of course, function of the BD recorder 10 are not limited to these functions.

The remote controller 20 outputs infrared commands (control signals) for controlling the BD recorder 10. By operating the remote controller 20, a user can remotely operate the BD recorder 10, that is, remote-control the BD recorder 10.

In this embodiment, various buttons 21 of the remote controller 20 are operated as appropriate (hereinafter, abridged as "button operations"). Further, by moving the remote controller 20 as appropriate as schematically indicated by arrows L, the BD recorder 10 can be controlled (hereinafter, abridged as "motion operations"). Note that, the button operations and the motion operations may be collectively referred to as "remote-controller operation."

[Remote-Operation Control Method]

Figure 2:
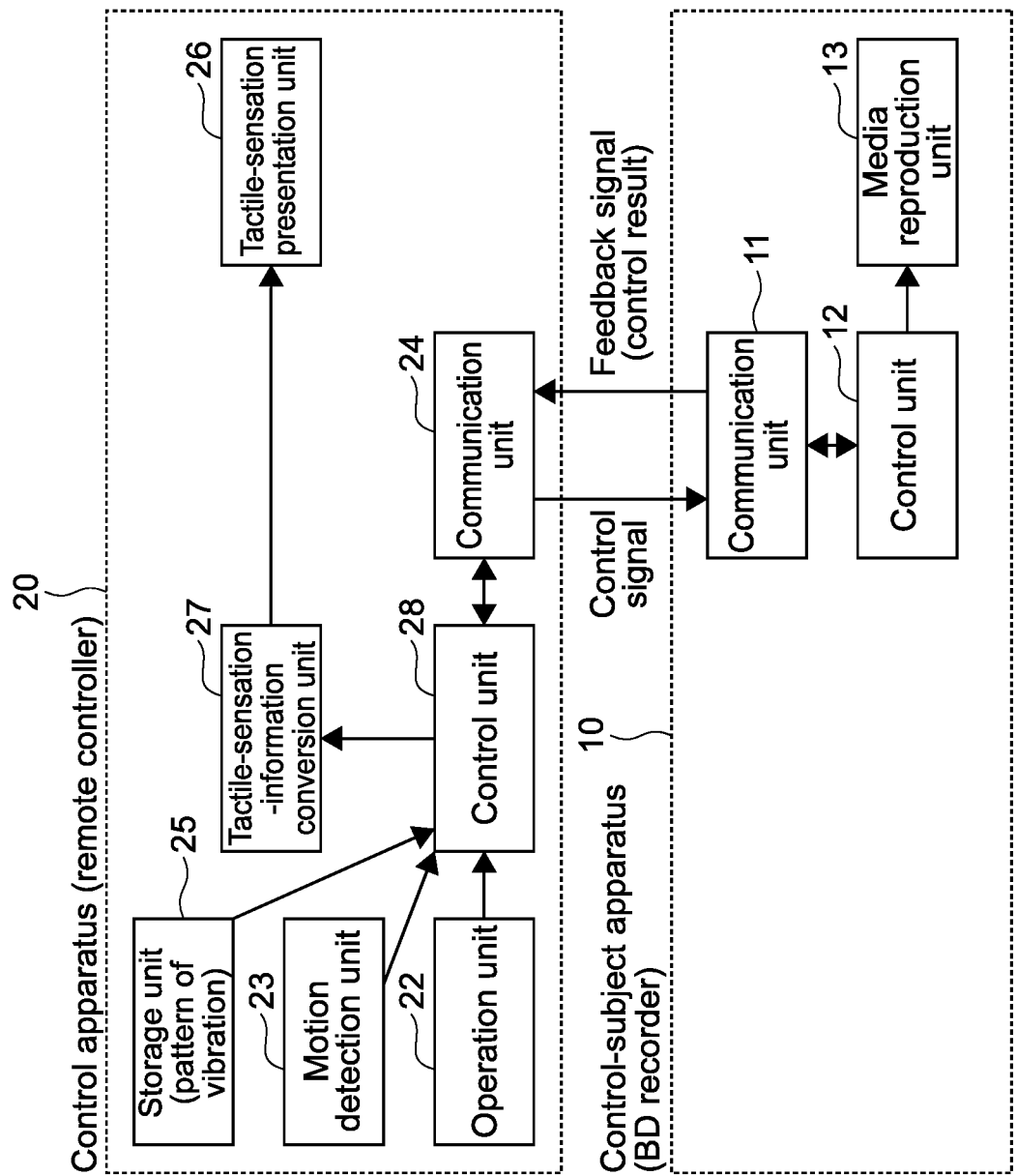
FIG. 2 A block diagram showing an example of functional configurations of a remote controller and a BD recorder.

FIG. 2 is a block diagram showing an example of functional configurations of the remote controller 20 and the BD recorder 10. FIG. 2 mainly shows blocks for carrying out a remote-operation control method according to the present technology (hereinafter, abbreviated as "control method").

First, an outline of the control method according to the present technology is described. A user performs the button operations and the motion operations. In response to the button operations and the motion operations, the BD recorder 10 performs the reproduction control of the program content item and the like or the volume control. At this time, vibration in patterns corresponding to the operations of the BD recorder 10 occurs as appropriate to the remote controller 20 (refer to zigzags in FIG. 1). On the basis of a tactile sensation by the vibration of the remote controller 20, the user can grasp a speed of the fast-forward, the volume, and the like.

As shown in FIG. 2, the remote controller 20 includes an operation unit 22, a motion detection unit 23, a communication unit 24, a storage unit 25, a tactile-sensation presentation unit 26, a tactile-sensation-information conversion unit 27, and a control unit 28.

The operation unit 22, which includes the various buttons 21 illustrated in FIG. 1, accepts the button operations by the user. Operation signals in response to the button operations are output to the control unit 28, and then, for example, generation of the infrared commands is performed.

The motion detection unit 23 detects a position, an orientation, a posture, and a motion of the remote controller 20. The motion detection unit 23 includes a GPS sensor and a nine-axis sensor. The GPS sensor acquires information items of the position of the remote controller. Further, the nine-axis sensor detects the orientation, the posture, and the motion of the remote controller 20. Specific algorithms for detecting the position, the motion, and the like are not limited. In addition, other devices may be used.

Figure 4:
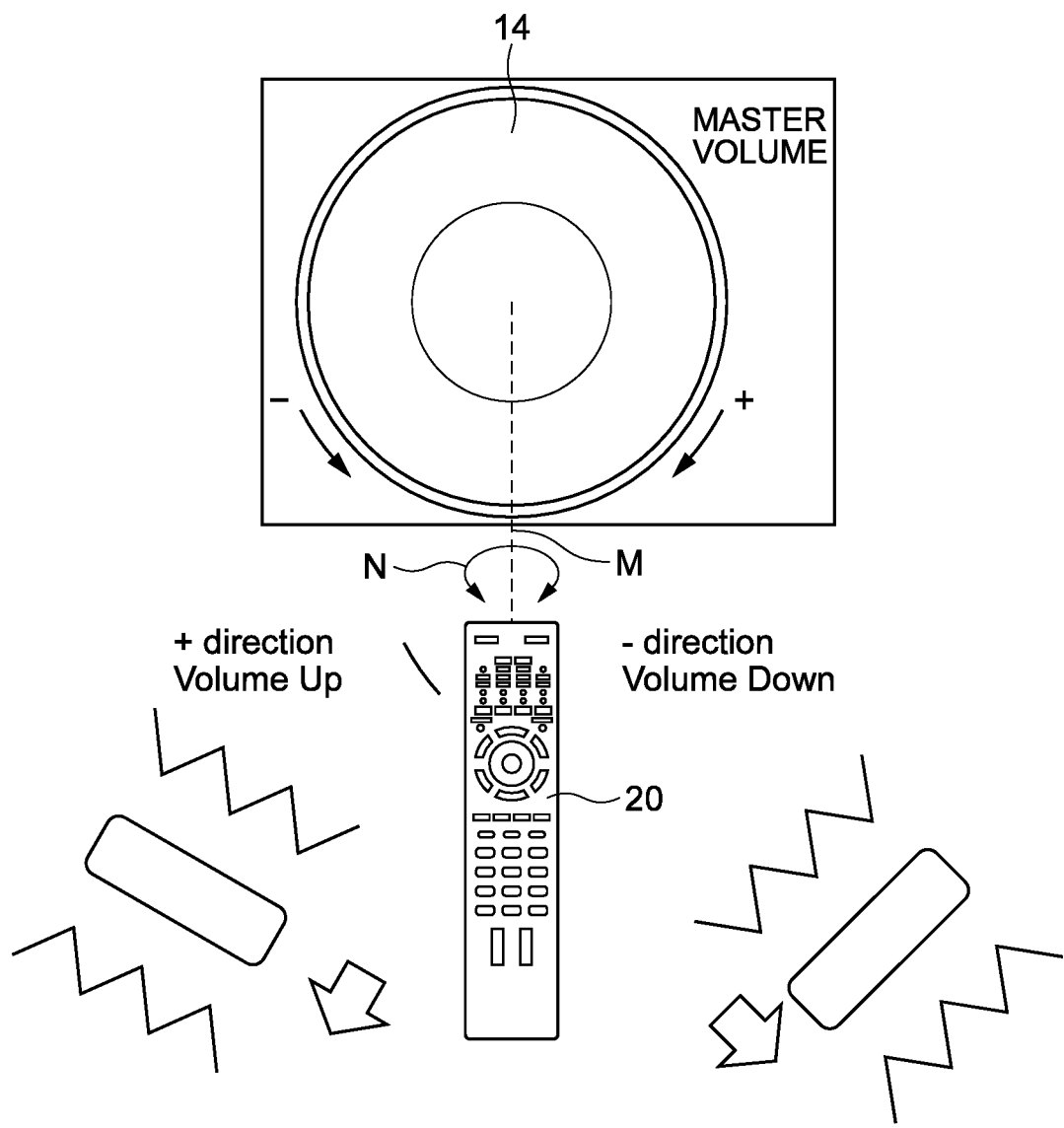
FIG. 4 A view illustrating an exemplary case where volume control is performed.

In this embodiment, the orientation of the remote controller 20 is detected on the basis of an orientation of a leading end of the remote controller 20 (which corresponds to an orientation of a reference axis M shown, for example, in FIG. 4). The posture of the remote controller 20 is detected on the basis of an angle in a three-dimensional space of the reference axis M, and a circling angle about the reference axis M. Further, the motion of the remote controller 20 is detected on the basis of changes of the position, the orientation, and the angle. Note that, the position, the orientation, the posture, and the motion of the remote controller 20 may be detected respectively on the basis of other parameters (detected values).

In this embodiment, the position, the orientation, the posture, and the motion of the remote controller 20 are included in a state of the remote controller 20. Thus, the motion detection unit 23 functions as a detection unit that detects the state of the remote controller 20.

In the following description, the position, the orientation, the posture, and the motion of the remote controller 20 may be collectively referred to as "the motion of the remote controller 20." The motion of the remote controller 20, which is detected by the motion detection unit 23, is output to the control unit 28. On the basis of the detected motion of the remote controller, the control unit 28 performs, for example, the generation of the infrared commands in response to the motion operations.

The communication unit 24, which is a module for performing infrared communication, includes an IR transmission unit/IR reception unit. In this embodiment, the communication unit 24 of the remote controller 20 and a communication unit 11 of the BD recorder 10 transmit/receive the infrared commands, and transmit/receive tactile-sensation-related information items described below. A specific configuration of the communication unit 24 is not limited.

The storage unit 25 is a nonvolatile storage device, and, for example, an HDD (Hard Disk Drive) is used thereas. In this embodiment, the patterns of the vibration that the remote controller 20 is caused to generate correspondingly to the operations of the BD recorder 10 are stored in the storage unit 25. For example, vibration patterns corresponding to the speed of the fast-forward and the volume are stored. More specifically, for example, waveform information items such as frequencies and amplitudes (intensities) of the vibration to be generated, and information items of changes of the waveforms are stored.

As examples of the patterns of the vibration, there may be mentioned "a vibration pattern having a predetermined frequency and a predetermined amplitude," "a vibration pattern that temporally changes in (either one of) frequency and amplitude," and "a vibration pattern having a frequency and an amplitude that can be represented by a composite waveform including a plurality of different waveforms."

Further, by controlling the frequencies, the vibration, and the like as appropriate, "a tactile sensation like a force generated in a predetermined direction," that is, a tactile sensation of being pulled or pushed in the predetermined direction can be presented. As a matter of course, a tactile sensation of changing temporally or randomly, for example, a force of being pulled also can be presented. Further, "a tactile sensation corresponding to the detected motion of the remote controller 20," specifically, for example, "a tactile sensation of hindering the motion of the remote controller 20," or "a tactile sensation of prompting the remote controller 20 to be moved" also can be presented. The vibration patterns include not only vibration patterns by which such tactile sensations can be presented, but also other arbitrary patterns for presenting various other tactile sensations.

In this embodiment, a vibration table relating the operations of the BD recorder 10 and the patterns of the vibration to each other is stored. However, as a matter of course, these information items need not necessarily be stored as information items in a table.

The tactile-sensation presentation unit 26, which is an actuator that causes the remote controller 20 to generate the vibration, includes a piezoelectric device and an eccentric motor. As the tactile-sensation presentation unit 26, for example, a plate-like piezoelectric element is arranged with its both ends and its central portion being supported. By inputting a drive signal to an input terminal of the piezoelectric element, the piezoelectric element can be vibrated with its both ends being nodes and its central portion being an antinode. Devices having such a configuration, or a kinesthetic-sense presentation device disclosed in WO/2015/151380 may be used. Alternatively, actuators having other arbitrary configurations also may be employed.

The tactile-sensation-information conversion unit 27 converts various information items corresponding to the operations of the BD recorder 10 to tactile information items. The tactile information items refer to information items that can be tactilely transmitted. In this embodiment, the tactile information items are generated by vibrating the remote controller 20. The tactile-sensation-information conversion unit 27 functions as a driver that drives the actuator being the tactile-sensation presentation unit 26.

The control unit 28 controls operations of the blocks of the remote controller 20. The control unit 28 has a hardware configuration necessary for a computer, specifically, includes a CPU and memories (RAM and ROM). When the CPU loads a program stored in the memories (or storage unit 25 in FIG. 2) to the RAM, and then executes the program, various processes are executed.

As the control unit 28, there may be used, for example, PLDs (Programmable Logic Devices) such as an FPGA (Field Programmable Gate Array), or other devices such as an ASIC (Application Specific Integrated Circuit).

In this embodiment, the infrared commands corresponding to the button operations and the motion operations are generated by the control unit 28, and then output via the communication unit 24. Another one of the blocks may be configured to generate the infrared commands, and may be controlled by the control unit 28.

Further, a vibration generating operation for generating the vibration in the pattern corresponding to the operation of the BD recorder 10 is performed by the control unit 28. In this embodiment, a feedback signal output by the BD recorder 10 is output to the control unit 28 of the remote controller 20 via the communication unit 24. In response to the received feedback signal, with reference to the vibration table stored in the storage unit 25, and on the basis of the motion of the remote controller 20, which is detected by the motion detection unit 23, the control unit 28 generates a vibration control signal for generating the vibration in the pattern corresponding to the operation of the BD recorder 10.

Thus, how the remote controller 20 is vibrated is determined by its control unit 28. Note that, the vibration control signal contains the waveform information items for generating, for example, the above-described "vibration having a predetermined frequency and a predetermined amplitude."

In response to the vibration control signal output from the control unit 28, the tactile-sensation-information conversion unit 27 generates the drive signal for driving the tactile-sensation presentation unit 26. The tactile-sensation presentation unit 26 is driven by the generated drive signal. With this, the vibration in the pattern corresponding to the operation of the BD recorder 10 is generated.

In this embodiment, the control unit 28 functions as a second output unit. Further, the control unit 28, the tactile-sensation-information conversion unit 27, and the tactile-sensation presentation unit 26 function as a second execution unit. In addition, the vibration generating operation for generating the vibration in the pattern corresponding to the operation of the BD recorder 10 corresponds to a tactile-sensation presentation operation for presenting the tactile sensation.

The BD recorder 10 includes the communication unit 11, a control unit 12, and a media reproduction unit 13. The communication unit 11 is another module for performing the infrared communication.

The control unit 12 includes a CPU and memories, and controls the blocks of the BD recorder 10. In this embodiment, the control unit 12 performs a predetermined operation corresponding to the infrared command output from the remote controller 20. For example, when the media reproduction unit 13 shown in FIG. 2 is controlled by the control unit 12, the reproduction control, the reproduction point selection, the volume control, and the like are performed. In addition, various functions such as the setting of recording reservation, and the deletion of recorded program-content items are exerted by the control unit 12 (blocks for exerting these functions are not shown).

Further, the feedback signals are generated by the control unit 12, and then output via the communication unit 11. The feedback signals contain results of the operations performed in response to the infrared commands from the remote controller 20. The results of the operations are, for example, results of the remote control, which include the speed of the fast-forward and a control value of the volume. Further, the results of the operations include those of chapter switching at a time when the chapter selection is performed. As a matter of course, the results of the operations may include a notification that the operation corresponding to the infrared command has been performed. In other words, a notification that the fast-forward has been performed and a notification that the volume has been changed themselves may be fed back as the results of the operations.

In this embodiment, the control unit 12 functions as a first output unit. Further, the control unit 12 functions also as a first execution unit. In addition, the operation results contained in the feedback signals correspond to the tactile-sensation-related information items each relating the predetermined operation.

Figure 3:
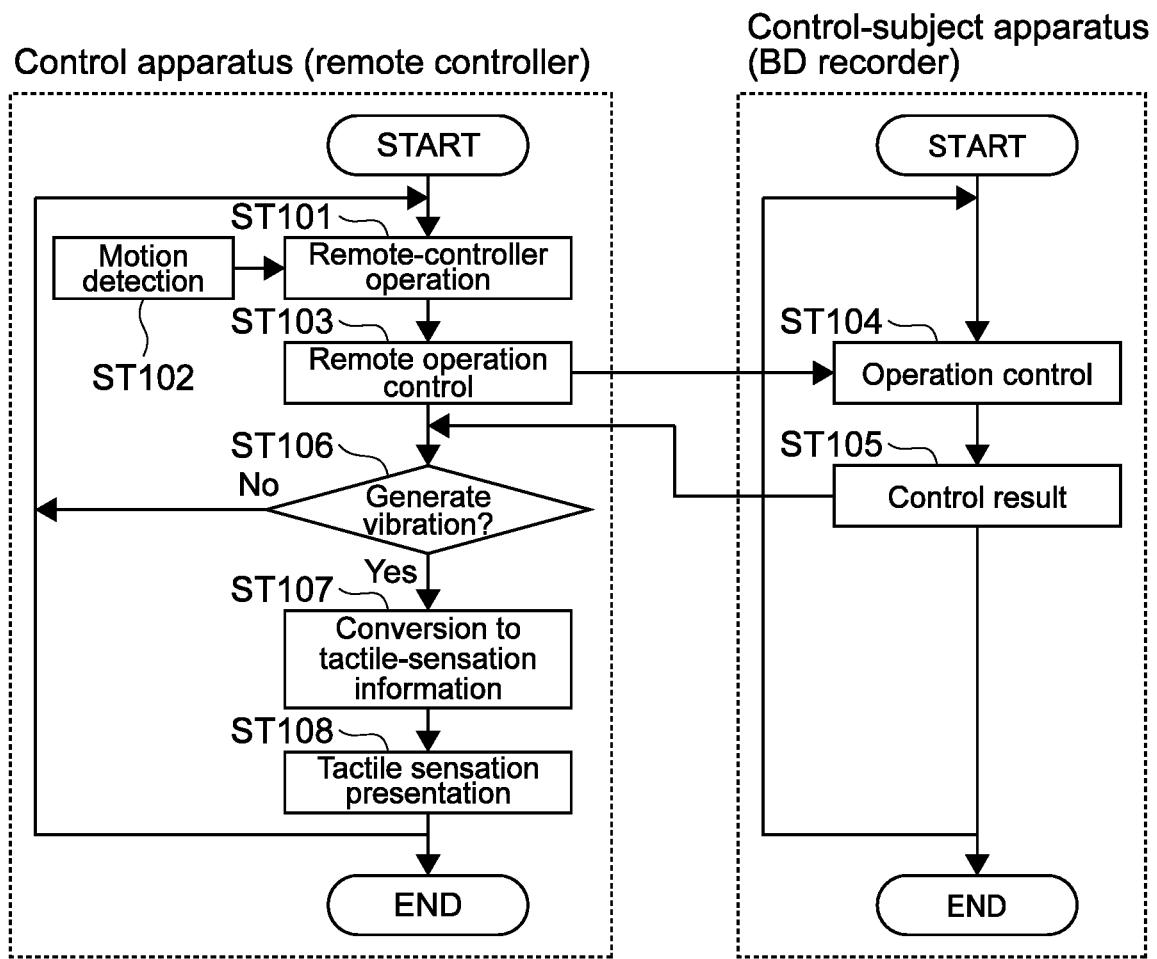
FIG. 3 A flowchart showing an example of a control method according to the first embodiment.

FIG. 3 is a flowchart showing an example of the control method according to this embodiment. Typically, a control mode of the remote control is selected by the button operations or the motion operations. Specifically, a mode of controlling the reproduction such as the fast-forward, a volume control mode, a chapter selection mode, and the like are selected. Then, in a selected one of the control modes, the vibration in the pattern corresponding to the operation of the BD recorder 10 is generated.

The user inputs the remote-controller operation (Step 101). Note that, when the motion operation is input, the motion of the remote controller 20 is detected (Step 102).

Remote operation control is performed in response to the input remote-controller operation. Specifically, the infrared command corresponding to the remote-controller operation is generated, and then output to the BD recorder 10 (Step 103).

In the BD recorder 10, operation control corresponding to the infrared command is performed (Step 104). Then, the feedback signal containing the control result (operation result) is output to the remote controller 20 (Step 105). The control unit 28 of the remote controller 20 determines, for example, on the basis of the control result or with reference to the vibration table, whether or not to generate the vibration (Step 106).

When the vibration is not generated (No in Step 106), the procedure returns to Step 101, and the input of the remote-controller operation is monitored.

When the vibration is generated (No in Step 106), the conversion to the tactile information item is performed. Specifically, the vibration control signal for generating the vibration is generated, and then output to the tactile-sensation-information conversion unit 27 (Step 107). When the tactile-sensation-information conversion unit 27 drives the tactile-sensation presentation unit 26, the vibration is generated. In other words, the tactile sensation corresponding to the operation of the BD recorder 10 is presented to the user (Step 108).

[Specific Example of Remote Control]

FIG. 4 to FIG. 8 are explanatory views for illustrating specific examples of the remote control with use of the remote controller 20. FIG. 4 is a schematic view illustrating an exemplary case where the volume control is performed by the control method according to the present technology. The volume control mode is activated, for example, by the button operations or the motion operations including changing the orientation of the remote controller 20.

When the user circles the remote controller 20 as indicated by arrows N, the infrared commands of the volume control are output correspondingly to circling directions (Steps 101 to 103). For example, the infrared commands are transmitted such that "Right-Hand Circling=Volume Up" and "Left-Hand Circling=Volume Down" are performed in accordance respectively with actual turning directions of a volume dial 14 of the BD recorder 10. In this way, operations can be intuitively performed, and hence operability is increased.

Figure 14:
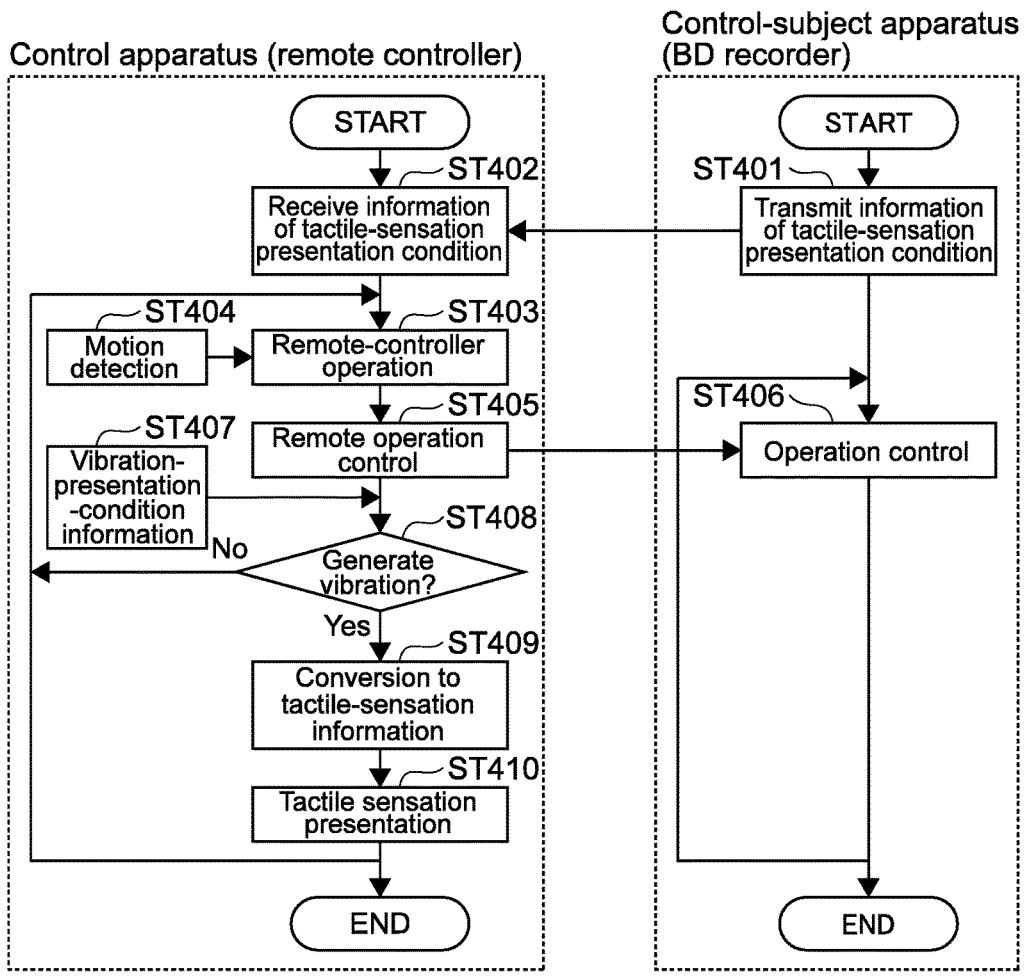
FIG. 14 A flowchart showing an example of a control method according to the fourth embodiment.

Note that, in FIG. 14, the volume dial 14 is schematically illustrated for describing relationships between the circling directions and the volume control, but the volume dial 14 is not necessarily displayed on the screen 16, and the remote controller 20 is not necessarily circled while being oriented to the volume dial 14. Typically, under a state in which the program content item and the like are displayed, the remote controller 20 is circled to perform the volume control. As a matter of course, the volume dial 14 may be displayed on the screen 16 of the television apparatus 15.

By the BD recorder 10, the volume control is performed, and the control result indicating which of "Volume Up" and "Volume Down" has been performed, and containing the control value (level) of the volume is fed back (Step 105). By the control unit 28 of the remote controller 20, the vibration is generated in a pattern corresponding to "Volume Up" or "Volume Down" and the control value of the volume (Steps 106 to 108).

In the example illustrated in FIG. 4, different tactile sensations are presented in accordance respectively with "Volume Up" and "Volume Down." For example, as illustrated in FIG. 4, tactile sensations of generating forces in directions corresponding to a positive direction and a negative direction of the volume are generated. Alternatively, the tactile sensation of hindering the remote controller 20 from circling (or tactile sensation of prompting the remote controller 20 to be circled) may be presented in accordance respectively with the circling directions of the remote controller 20. In this way, "Volume Up" and "Volume Down" can be tactilely and respectively grasped.

Further, intensities of the tactile sensations (intensities of the vibration) may be changed in accordance with the level of the volume. For example, the tactile sensation to be presented becomes stronger as the level of the volume becomes higher, and the tactile sensation to be presented becomes weaker as the level of the volume becomes lower. In this way, the volume level can be tactilely grasped. In addition, for example, a risk that the volume is inadvertently increased can be prevented.

Figure 5:
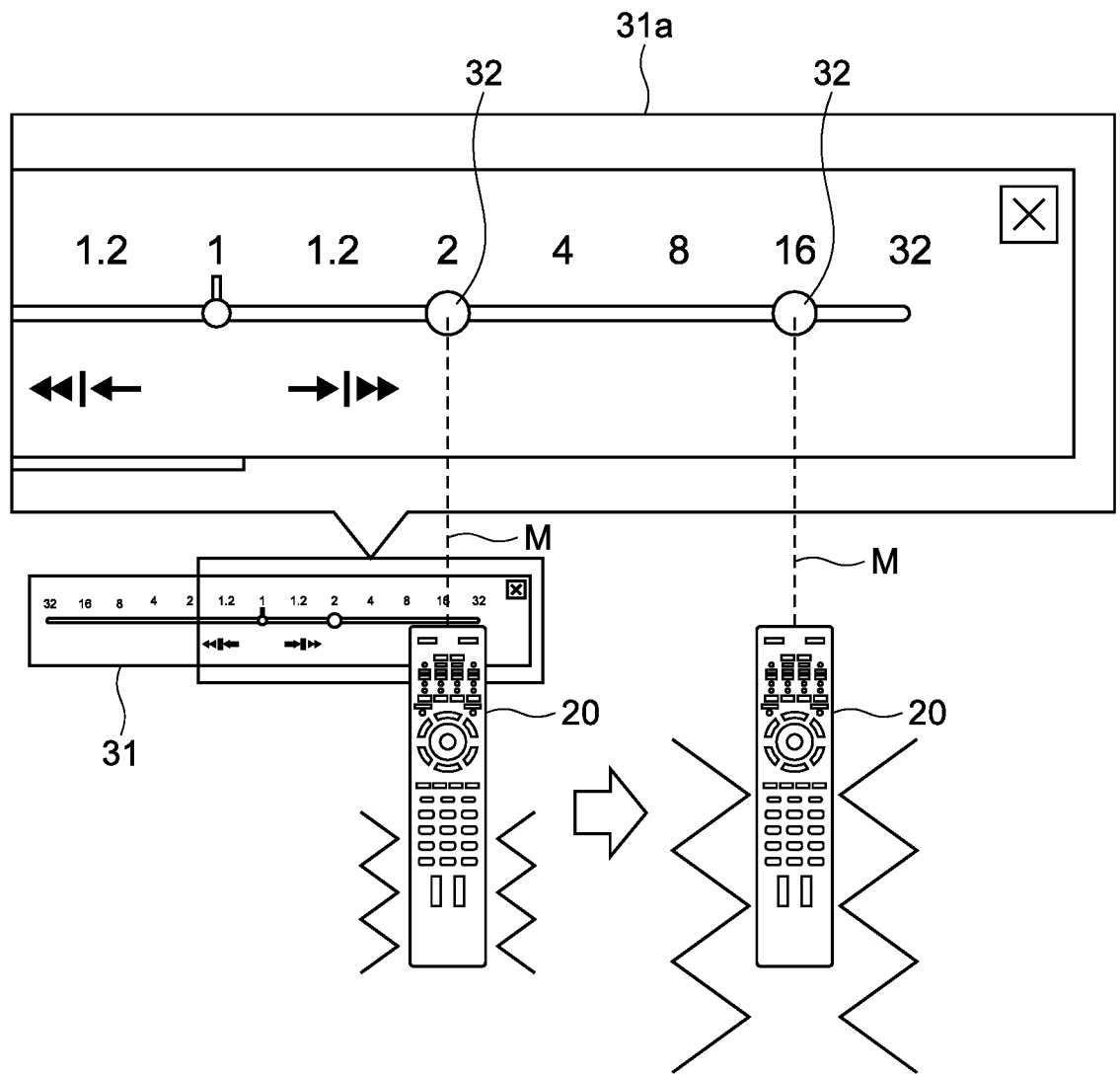
FIG. 5 A view illustrating an exemplary case where fast-forward/rewind is performed.

FIG. 5 is a schematic view illustrating an exemplary case where the fast-forward/rewind is performed as the reproduction control. For example, an operation UI 31 for the fast-forward/rewind is displayed on the screen 16 of the television apparatus 15. In the case described in this example, the motion operation is performed with respect to an operation UI 31a displayed on an enlarged scale. Typically, in order that representation of content items is not hindered, the operation UI 31 with respect to which the motion operation is performed is displayed in a corner of the screen 16.

For example, a position of the remote controller 20 at a time when a fast-forward/rewind mode is activated is set as a reference, and this reference position is adjusted to "1" being a position of normal reproduction (position at which neither the fast-forward nor the rewind is performed). The infrared command, which corresponds to the fast-forward/ rewind, is output correspondingly to a motion to the right or the left from the reference position (Steps 101 to 103).

For example, the infrared command is transmitted such that "Motion to Right=Fast-Forward" or "Motion To Left=Rewind" is performed in accordance with a direction of the fast-forward/rewind in the operation UI 31a. In this way, operations can be intuitively performed, and hence operability is increased.

Typically, the fast-forward/rewind mode is activated under a state in which the remote controller 20 is oriented to "1" being the position of the normal reproduction. With this, as illustrated in FIG. 5, the remote control can be performed under a state in which the orientation of the remote controller 20 and a position of a slider 32 correspond to each other. As a matter of course, this state need not necessarily be established, and the fast-forward/rewind may be performed by moving the remote controller 20 irrespective of where the operation UI 31 is displayed on the screen 16. With this, the remote control can be performed in a free posture.

The BD recorder 10 performs the fast-forward or the rewind at a speed in accordance with an amount of the motion to the right or the left (Step 104). The control result indicating which of the fast-forward and the rewind has been performed, and containing the speed is fed back (Step 105). Then, the vibration is generated in a pattern corresponding to the fast-forward/rewind and the speed (Steps 106 to 108).

For example, the tactile sensation of hindering the remote controller 20 from moving in the right-and-left direction (or tactile sensation of prompting the remote controller 20 to be moved in the right-and-left direction) is presented. Further, the tactile sensation to be presented becomes stronger as the speed becomes higher. In this way, the fast-forward/rewind can be performed tactilely and with high operability.

Note that, the fast-forward/rewind can be performed not only by moving the remote controller 20 in the right-and-left direction, but also by changing the orientation of the remote controller 20 in the right-and-left direction. In this case, the fast-forward/rewind and the speed are controlled correspondingly to the circling angle in the right-and-left direction.

The remote controller 20 may be capable of detecting which position the leading end portion of the remote controller 20 is pointing to. In this case, when the remote controller 20 points to a vicinity of "1" in the operation UI 31a, the fast-forward/rewind mode is activated. Then, in response to the motions in the right-and-left direction and to the changes of the orientation of the remote controller 20, the slider 32 is moved to the position which the remote controller 20 points to. In this way, the fast-forward/rewind is performed. In order that the position which the remote controller 20 points to is detected, a light source device that emits a guide light beam may be provided on the television apparatus 15 side, or an imaging device or the like may be provided at the leading end of the remote controller 20.

Figure 6:
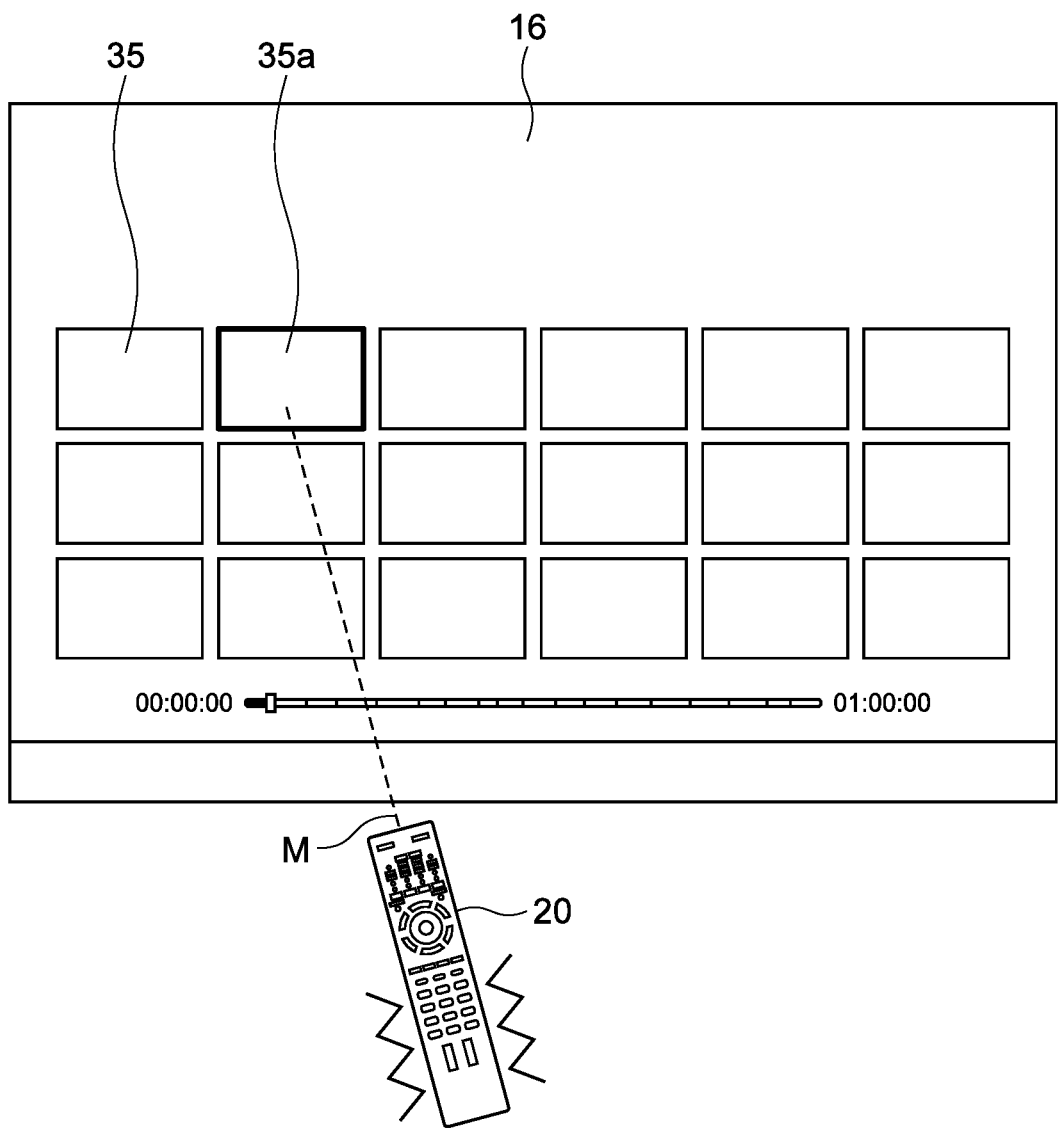
FIG. 6 A view illustrating an exemplary case where chapter selection is performed.

FIG. 6 is a schematic view illustrating an exemplary case where the chapter selection is performed as the reproduction point selection. For example, when the chapter selection mode is activated, a list of thumbnail images 35 of scenes contained respectively in chapters is displayed.

When the position which the remote controller 20 is to be pointing to is not used, one of the thumbnail images 35, which corresponds to a predetermined chapter, enters a selection mode (highlighted, for example, with a bold frame) (refer to thumbnail image 35a). When the position which the remote controller 20 is to be pointing to is detected, one of the thumbnail images 35, which is displayed at this position, enters the selection mode.

The user changes the position and the orientation of the remote controller 20 in the right-and-left direction and an upper-and-lower direction. In response to the motion of the remote controller 20, the infrared command for the chapter selection is output (Steps 101 to 103).

In response, for example, to the motions in the right-and-left direction and the upper-and-lower direction and to the changes of the orientation of the remote controller 20, the thumbnail images 35a to enter the selection mode are switched. Alternatively, the thumbnail images 35a in the selection mode are switched correspondingly to the changes of the position which the remote controller 20 is pointing to (Step 104). In this way, operations can be intuitively performed. In the following, the selection-target thumbnail images 35a may be referred to as selection-target chapters.

The BD recorder 10 feeds back the control result containing a notification that the selection-target chapters have been switched (Step 105). Then, the vibration is generated at an appropriate timing with a timing when the selection-target chapters have been switched (Steps 106 to 108). Thus, for example, when the selection-target chapters are switched four times successively, the remote controller 20 vibrates four times at the switching timings. Typically, the vibration is generated at a timing when the position which the remote controller 20 points to is located between the thumbnail images 35.

In this way, the user can tactilely and reliably grasp that the chapters have been switched. Further, how many times the chapters have been switched also can be grasped, and hence one of the reproduction-target chapters after the switching can be easily grasped.

Note that, tactile sensations different from each other may be presented respectively by switching to a chapter on the right (switching to an immediately subsequent chapter), switching to a chapter on the left (switching to an immediately preceding chapter), switching to a chapter displayed below (switching to a chapter after a predetermined time interval), and switching to a chapter displayed above (switching to a chapter before a predetermined time interval). With this, high operability can be exerted, and hence a reproduction point can be easily selected.

Figure 7:
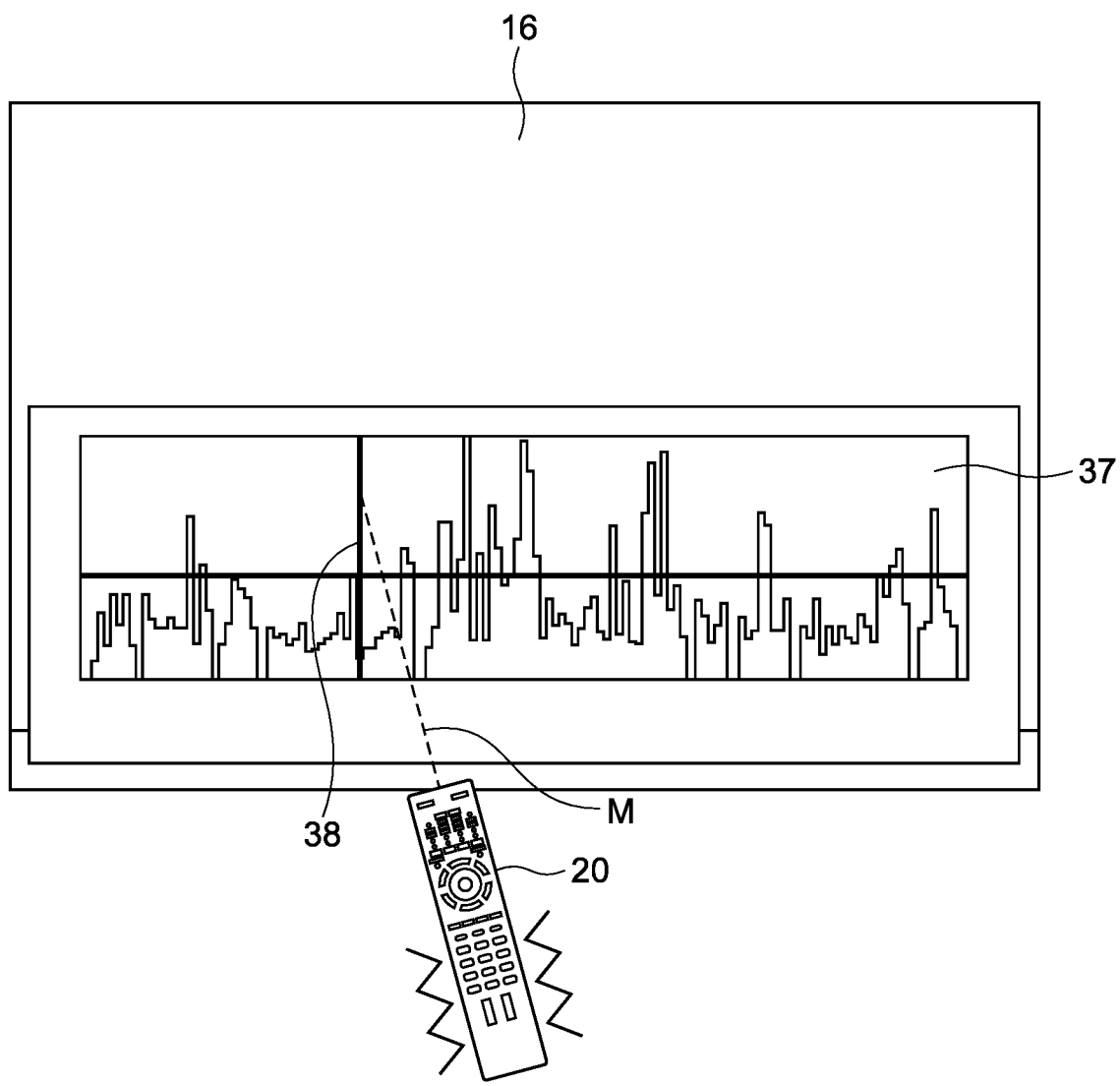
FIG. 7 A view illustrating an exemplary case where a reproduction point selection is performed on the basis of excitement levels.

FIG. 7 is a schematic view illustrating an exemplary case where the reproduction point selection is performed on the basis of excitement levels in a content item. For example, when an excitement reproduction mode is activated, an operation UI 37 showing the excitement levels along a time line is displayed.

The excitement levels in the content item are generated, for example, by broadcasters or content distributors, and then distributed as metadata items to the BD recorder 10. Alternatively, the excitement levels may be calculated by the BD recorder 10.

The excitement levels are calculated, for example, from audience ratings at respective time points of a program content item, or the number of comments relating to the program, which are uploaded to an SNS (Social Networking Service). Alternatively, the excitement levels may be calculated, for example, from images and voice in the content item. In a case of, for example, a sports content item, excitement of audience is applied to volume levels, and a timing corresponding to a high volume is calculated as a timing corresponding to a high excitement level. Alternatively, an arbitrary content-analysis technology may be used to calculate the excitement levels.

In response to the motions in the right-and-left direction of the remote controller 20 with respect to the orientation of the remote controller 20 at the time of the activation of the excitement reproduction mode, or following the position which the remote controller 20 points to, a time bar 38 indicating a reproduction point is shifted (Steps 101 to 104). From the BD recorder 10, an excitement level at this reproduction point is fed back as the control result (Step 105). The vibration is generated in a pattern corresponding to the fed-back excitement level (Steps 106 to 108).

For example, the vibration is generated with an intensity in accordance with the excitement level. With this, the user can reproduce the content item from a sufficiently exciting scene by inputting the reproduction point selection at a position where the strong vibration occurs. Note that, the content item may be reproduced from a point slightly before the selected reproduction point. With this, the content item may be reproduced from immediately before the exciting scene.

A predetermined threshold with respect to the excitement levels may be set such that the remote controller is vibrated when the excitement level exceeds the threshold. Further, types of scenes corresponding to high excitement levels may be distinguished from each other, and different tactile sensations may be presented correspondingly to the types of the scenes. With this, the user can search for, with high accuracy, scenes that he/she wants to watch.

Further, a tactile sensation that directs the user to a reproduction point corresponding to a high excitement level may be presented. For example, as the reproduction point corresponding to the high excitement level becomes closer, the tactile sensation of hindering the remote controller 20 from moving is generated. With this, it is possible, for example, to search for the reproduction point corresponding to the high excitement level with high accuracy, and to prevent this point from being overlooked. Further, in a case where the reproduction point corresponding to the high excitement level is overlooked, a tactile sensation that provides a force in a reverse direction, that is, a force of moving back the remote controller 20 may be presented.

As other examples of the reproduction point selection, there may be mentioned presentations of tactile sensations correspondingly to scene switching points and to points of commercial periods in the content item. With this, reproduction from a point from which the user wants to start viewing, and reproduction from a point at which the commercial ends can be tactilely and easily performed.

Figure 8:
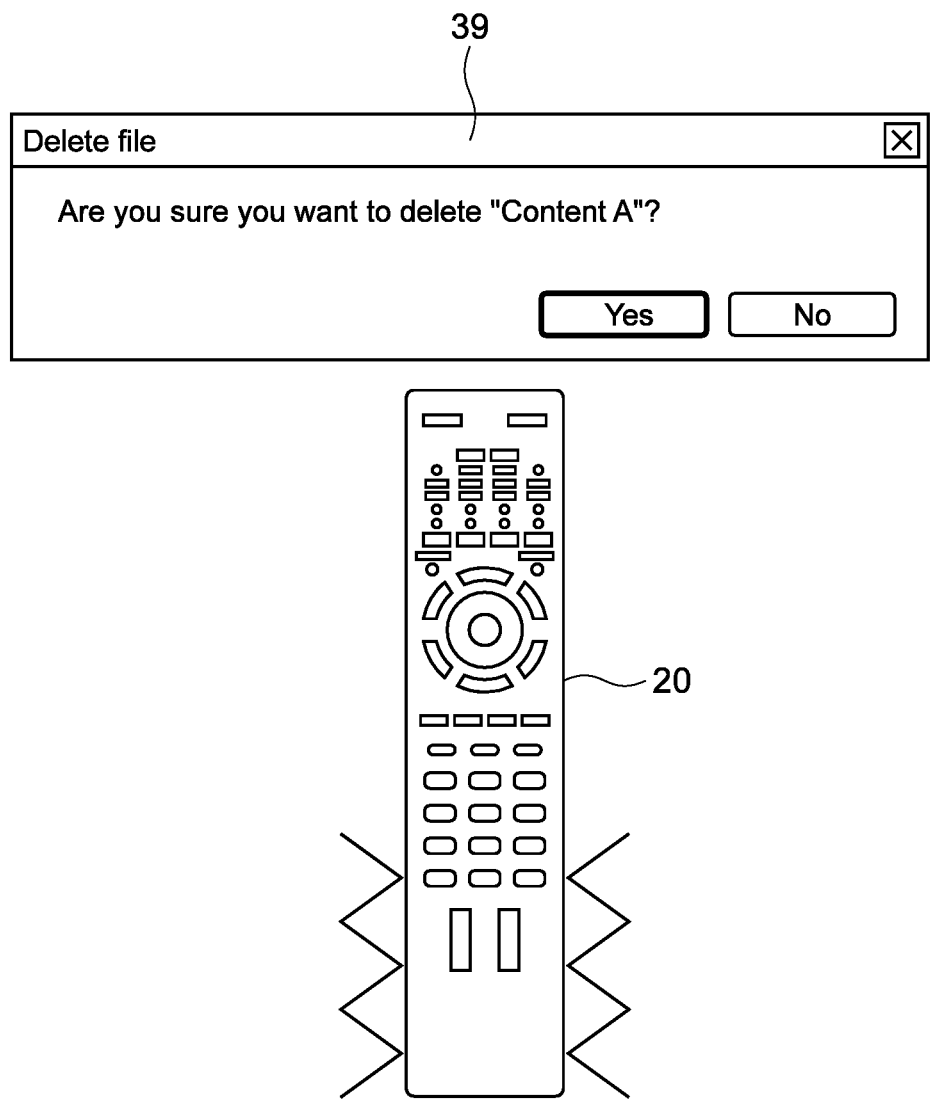
FIG. 8 A view illustrating an exemplary case where deletion of a content item is performed.

FIG. 8 is a schematic view illustrating an exemplary case where the deletion of a content item is performed. For example, when a data deletion mode is activated, a list of the content items stored in the BD recorder 10 is displayed. For example, as in the chapter selection illustrated in FIG. 6, deletion-target content items are switched in response to the input of the motion operation (Steps 101 to 104).

From the BD recorder 10, an importance of the content item selected as a deletion target is fed back as the control result (Step 105). The importance is set, for example, by the user. Alternatively, the importance may be set automatically by the BD recorder 10. More specifically, the importance is set automatically on the basis of, for example, types of the content items or a reservation status. Alternatively, content items that the user thinks important, and content items that the user likes may be distinguished from each other on the basis of previous settings made by the user, and then the importance may be set as appropriate.

The remote controller 20 is vibrated (Steps 106 to 108) in accordance with the fed-back importance. For example, as the importance becomes higher, the vibration to be generated becomes stronger. With this, the user can tactilely and easily grasp the importance of the deletion-target content item. As a result, deletion of data items can be performed with high operability, and erroneous operations such as erroneous deletion of a content item of high importance can be prevented. Note that, different tactile sensations can be presented correspondingly to the types of the content items. With this, high operability is exerted.

Note that, every time the deletion-target content items are switched, or in response, for example, to input of a predetermined motion operation, as illustrated in FIG. 8, a pop-up 39 for asking whether to delete a file may be displayed. With this, the erroneous operations and the like can be reliably prevented.

The control modes illustrated in FIG. 4 to FIG. 8 may be executed in combinations with each other. For example, the fast-forward/rewind illustrated in FIG. 5 and the reproduction point selection illustrated in FIG. 6 and FIG. 7 may be combined with each other. With this, it is possible, for example, to search for the point corresponding to the high excitement level while performing the fast-forward. By setting different tactile sensations respectively for the excitement level and the speed of the fast-forward, both the excitement level and the speed of the fast-forward can be grasped.

As described above, in the control system 100 according to this embodiment, the remote controller 20 outputs the infrared command corresponding to the state (position, orientation, posture, and motion) of the remote controller 20. Then, the BD recorder 10 outputs the control result relating to the predetermined operation corresponding to the infrared command. After the remote controller 20 receives the control result, on the basis of this control result, the remote controller 20 causes the remote controller 20 itself to vibrate. With this, the user who operates the remote controller 20 can remote-control the BD recorder 10 on the basis not only of his/her visual perception and auditory perception but also of his/her tactile sensation. Thus, high operability is exerted.

Further, when the motion operation is input, it is difficult to grasp whether the remote control is being properly performed. Specifically, it is difficult to grasp a correspondence between a motion of user's hand and, for example, the volume control. Thus, a problem that the user has difficulties in performing the control despite moving his/her hand, and a risk that the user inadvertently increases the volume to be higher than he/she wants are liable to arise. According to this embodiment, the tactile sensations corresponding to the control modes can be obtained, and hence operability at the time of the motion operation can be significantly increased.

Second Embodiment

Now, a control system according to a second embodiment of the present technology is described. Hereinbelow, description of the same configurations and the same functions as those in the control system 100 according to the above-described embodiment is omitted or simplified.

Figure 9:
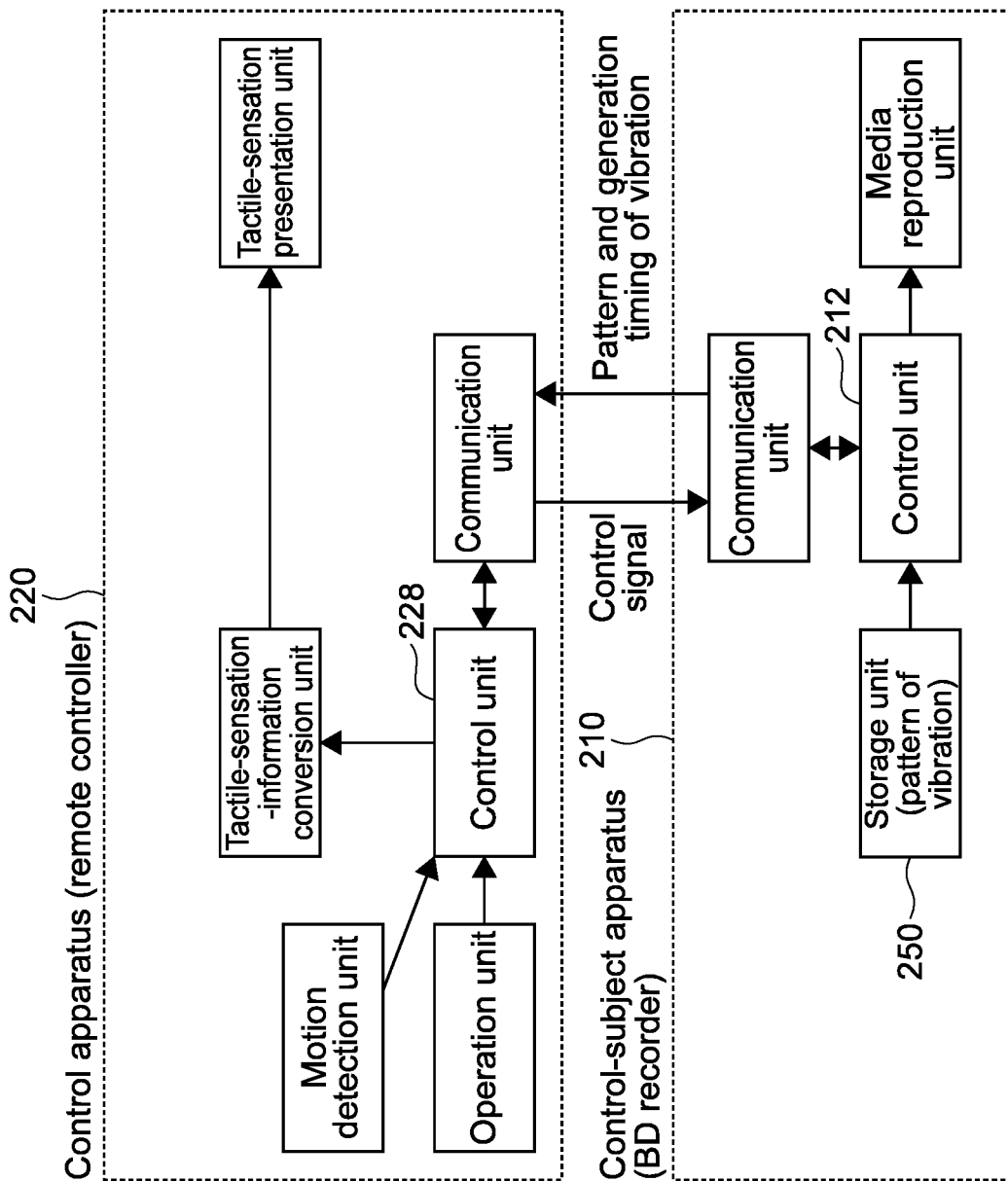
FIG. 9 A block diagram showing an example of functional configurations of a remote controller and a BD recorder according to a second embodiment.
Figure 10:
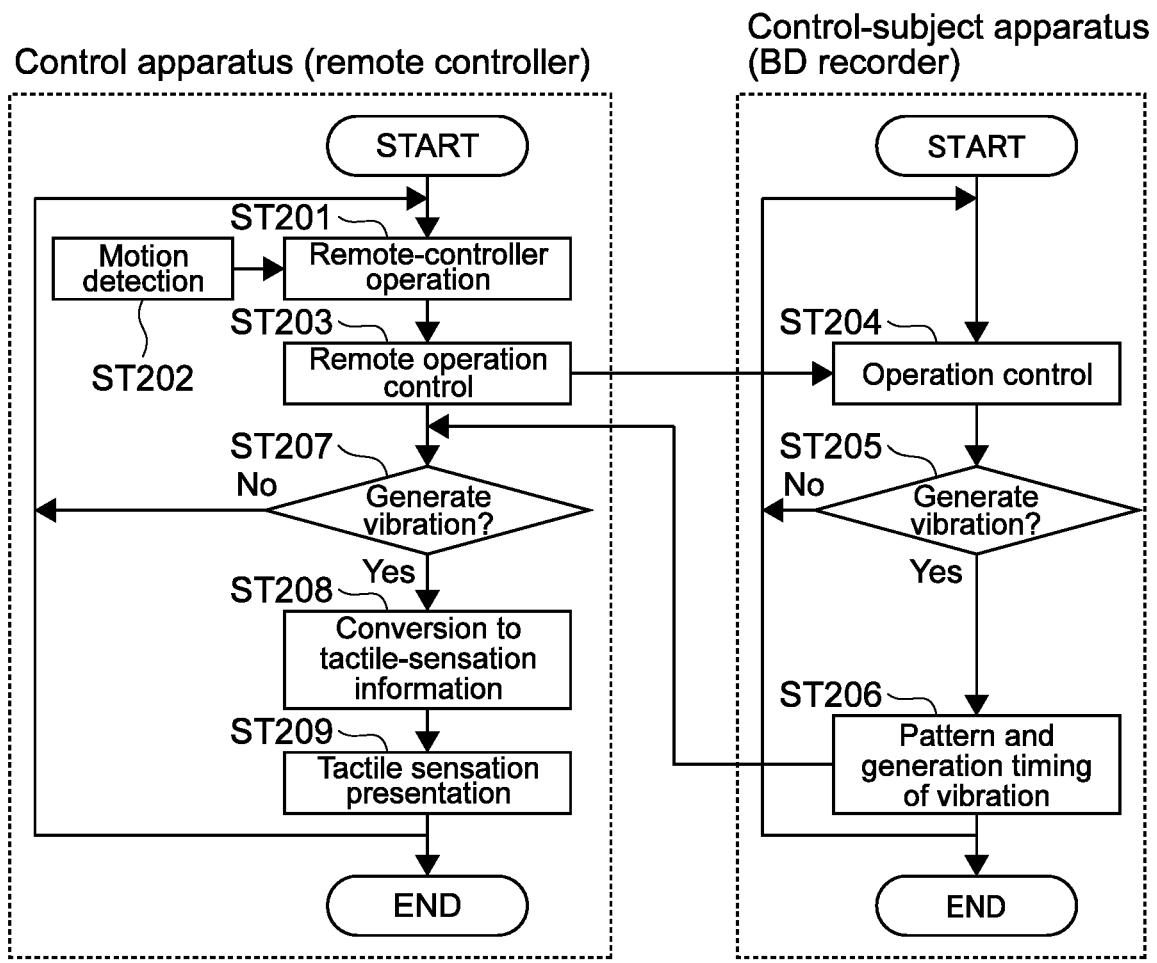
FIG. 10 A flowchart showing an example of a control method according to the second embodiment.

FIG. 9 is a block diagram showing an example of functional configurations of a remote controller 220 and a BD recorder 210 according to the second embodiment. FIG. 10 is a flowchart showing an example of a control method according to this embodiment.

In this embodiment, the vibration patterns corresponding to the operations, and generation timings of the vibration are determined by a control unit 212 of the BD recorder 210. Further, from the BD recorder 210 to the remote controller 220, the patterns and the generation timings of the vibration are output as the tactile-sensation-related information items.

As shown in FIG. 9, a vibration table relating operations of the BD recorder 210 and the patterns of the vibration to each other is stored in a storage unit 250 of the BD recorder 210. Note that, the patterns and the generation timings of the vibration correspond to patterns of tactile sensations and presentation timings of the tactile sensations.

As shown in FIG. 10, the infrared command corresponding, for example, to the motion operation is transmitted to control the operation of the BD recorder 210 (Steps 201 to 204). With reference to the vibration table, the control unit 212 of the BD recorder 210 determines whether or not to generate the vibration (Step 205). When the vibration is not generated (No in Step 205), the procedure returns to Step 204.

When the vibration is generated (Yes in Step 205), the pattern of the vibration and the generation timing of the vibration are determined with reference to the vibration table, and then output to the remote controller 220 (Step 206).

On the basis of the pattern and the generation timing of the vibration, which are output from the BD recorder 210, a control unit 228 of the remote controller 220 determines whether or not to generate the vibration (Step 207). Typically, when the pattern and the generation timing of the vibration are received from the BD recorder 210, the vibration is generated on the basis of these information items (YES in Step 207 to Step 209). Meanwhile, the user may make a setting not to generate the vibration, or the generation of the vibration may be restricted depending on a state of the remote controller 220 (No in Step 207).

In this way, on the BD recorder 210 side, the patterns and the generation timings of the vibration may be determined. Also in this case, for example, the volume control, the reproduction control, the reproduction point selection, and the data deletion illustrated in FIG. 4 to FIG. 8 can be performed. Examples of the control modes (examples of patterns and generation timings of the vibration in the control modes) are mentioned below, but are not limited thereto.

Volume Control . . . (Vibration in Pattern Corresponding to Control Value of Volume, and Timing When Volume Changes)

Fast-Forward/Rewind . . . (Vibration in Pattern Corresponding to Speed, and Timing When Speed Changes)

Chapter Selection . . . (Vibration in Pattern Corresponding to Switching, and Timing When Chapters Are Switched)

Excitement Reproduction . . . (Vibration in Pattern Corresponding to Excitement Level, and Timing When Reproduction Points Are Switched)

Data Deletion . . . (Vibration in Pattern Corresponding to Importance, and Timing When Deletion-Target Data Items Are Switched)

Third Embodiment

Figure 11:
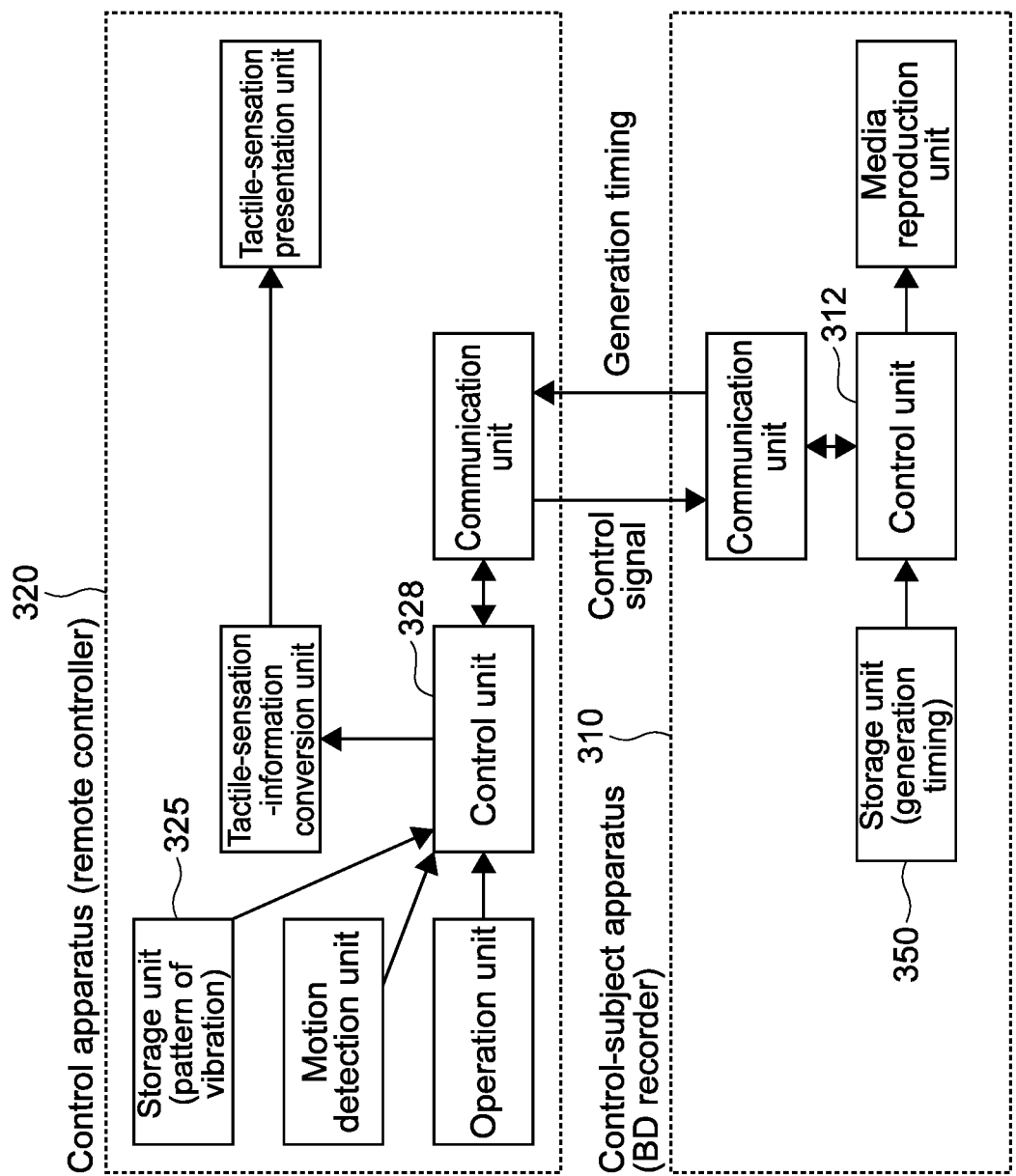
FIG. 11 A block diagram showing an example of functional configurations of a remote controller and a BD recorder according to a third embodiment.
Figure 12:
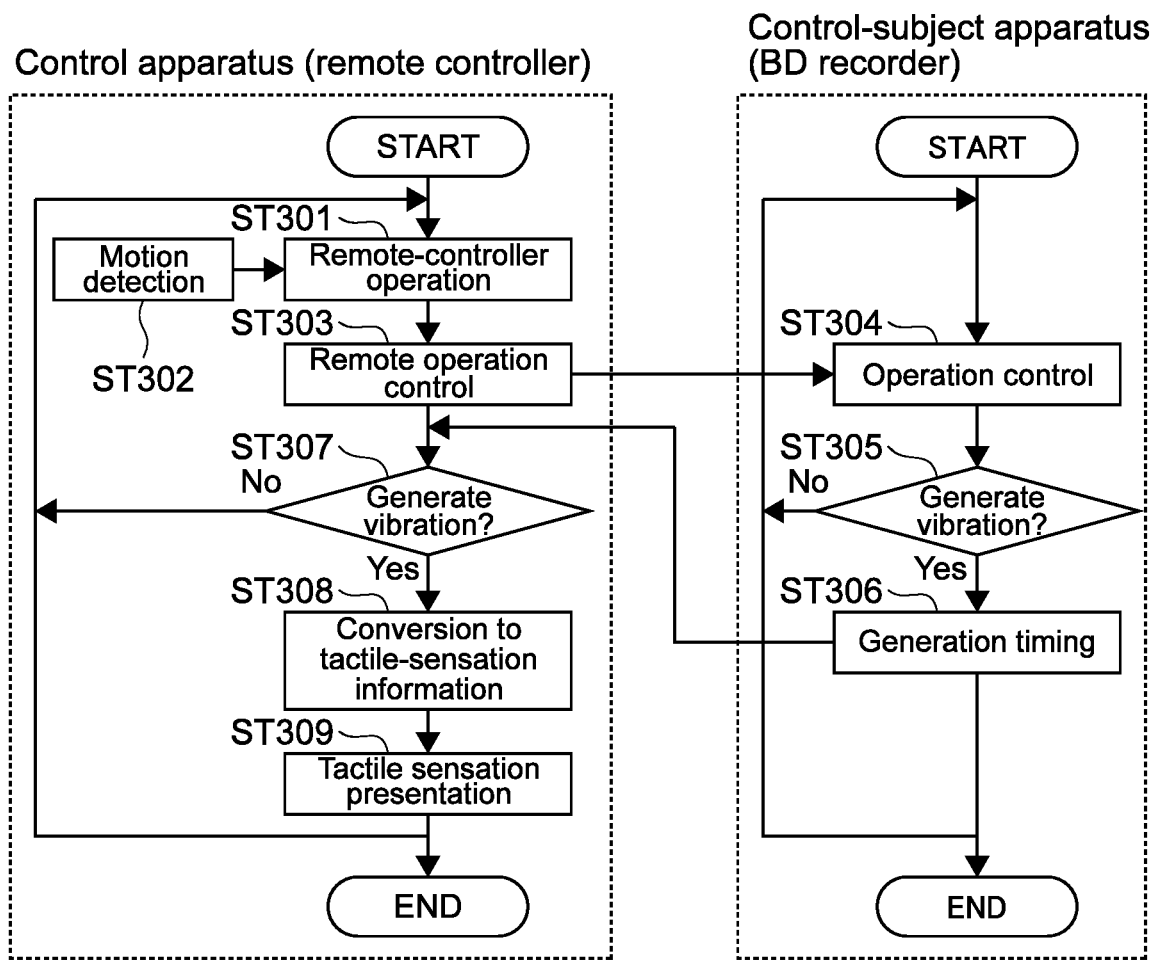
FIG. 12 A flowchart showing an example of a control method according to the third embodiment.

FIG. 11 is a block diagram showing an example of functional configurations of a remote controller 320 and a BD recorder 310 according to a third embodiment. FIG. 12 is a flowchart showing an example of a control method according to this embodiment.

In this embodiment, the generation timings of the vibration in response to the operations are determined by a control unit 312 of the BD recorder 310, and output as the tactile-sensation-related information items to the remote controller 320. Thus, in a storage unit 350 of the BD recorder 310, a timing table relating operations of the BD recorder 310 and the generation timings to each other is stored.

As shown in FIG. 12, the infrared command corresponding, for example, to the motion operation is transmitted to control the operation of the BD recorder 310 (Steps 301 to 304). With reference to the timing table, the control unit 312 of the BD recorder 310 determines whether or not to generate the vibration (Step 305). Then, when the vibration is generated (Yes in Step 305), the generation timing of the vibration is output (Step 306).

On the basis of the generation timing output from the BD recorder 310, and with reference to a vibration table stored in a storage unit 325, a control unit 328 of the remote controller 320 determines whether or not to generate the vibration (Step 307). Then, the vibration is generated in a predetermined pattern at the received generation timing (Yes in Step 307 to Step 309).

In this way, the generation timings of the vibration may be determined on the BD recorder 310 side, and the patterns of the vibration may be determined on the remote controller 320 side. Also in this case, for example, the volume control, the reproduction control, the reproduction point selection, and the data deletion illustrated in FIG. 4 to FIG. 8 can be performed. In particular, control modes in which the generation timings of the vibration are important, such as the chapter switching, can be executed while curbing processing loads on both the apparatuses.

As a matter of course, this embodiment is applicable also to the volume control and the fast-forward/rewind. In these cases, intensities of the vibration are determined as appropriate by calculating, on the remote controller 320 side, the control value of the volume and the speed of the fast-forward corresponding to a motion of the remote controller 320. As a matter of course, how the intensities of the vibration are determined is not limited thereto.

Fourth Embodiment

Figure 13:
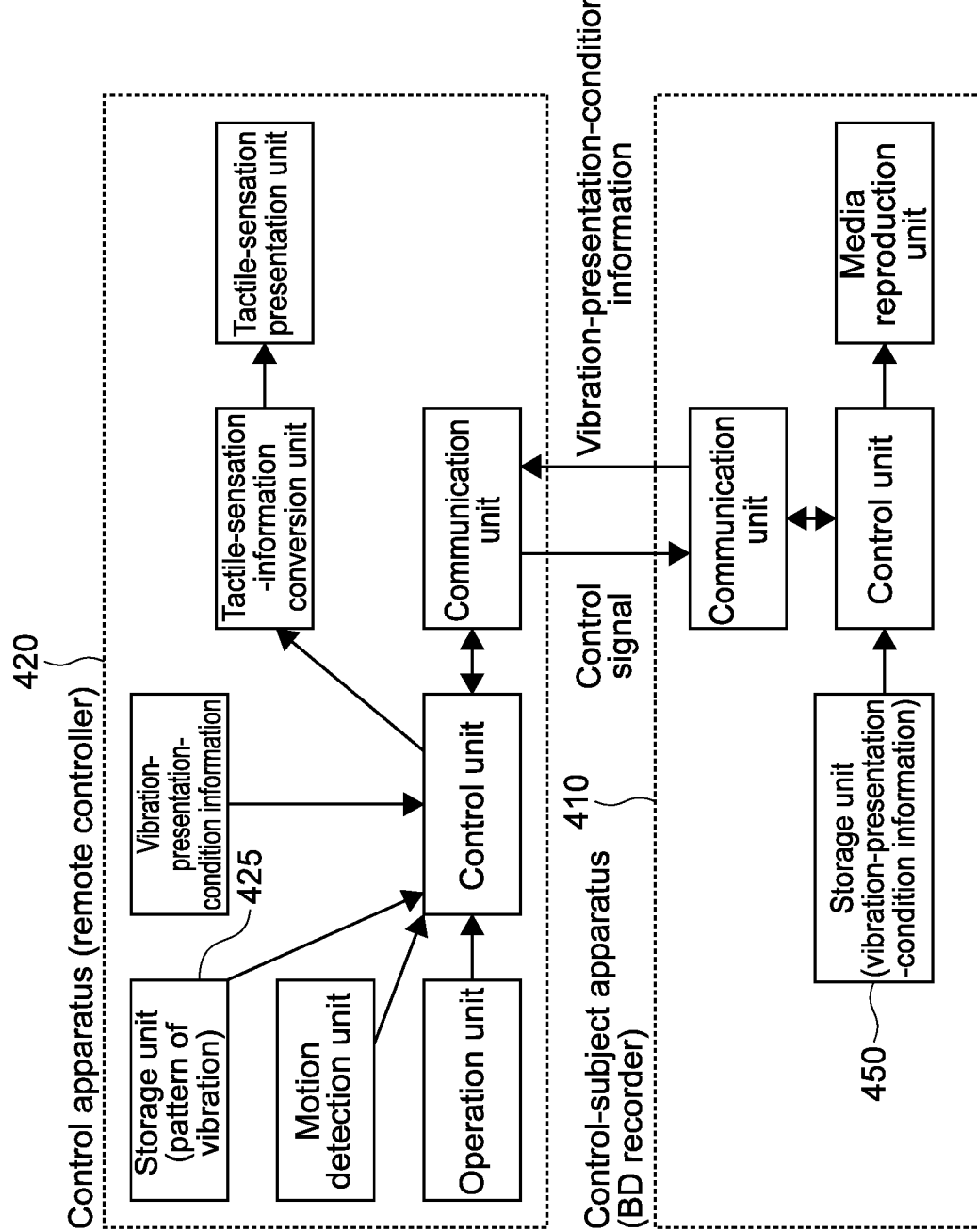
FIG. 13 A block diagram showing an example of functional configurations of a remote controller and a BD recorder according to a fourth embodiment.

FIG. 13 is a block diagram showing an example of functional configurations of a remote controller 420 and a BD recorder 410 according to a fourth embodiment. FIG. 14 is a flowchart showing an example of a control method according to this embodiment.

In this embodiment, from the BD recorder 410 to the remote controller 420, tactile-sensation presentation conditions relating to states of the remote controller 410 are output as the tactile-sensation-related information items. The tactile-sensation presentation conditions relating to the states of the remote controller 420 are, for example, each a condition information item of generating a tactile sensation in a predetermined pattern at a time when the remote controller 420 enters a predetermined state. In this embodiment, vibration-presentation-condition information items relating to motions of the remote controller 420 are output.

As shown in FIG. 13, the vibration-presentation-condition information items are output to a storage unit 450 of the BD recorder 410. The vibration-presentation-condition information items are set correspondingly to the control modes such as the reproduction control and the volume control. For example, it is assumed that operations of the BD recorder 410 are controlled by performing, respectively in the control modes, the motion operations described with reference to FIG. 4 to FIG. 8. At these times, the motion operations (motions of the remote controller) for executing control modes to which the patterns of the vibration to be generated correspond are stored as vibration generating conditions.

As examples of the condition information item of the reproduction control, there may be mentioned moving the remote controller 420 by a predetermined amount in the right-and-left direction (including motions and changes of its orientation), and generating the vibration in the pattern corresponding to the fast-forward/rewind with an intensity in accordance with the moving amount. As an example of the condition information item of the volume control, there may be mentioned generating the vibration in the pattern corresponding to "Volume Up"/"Volume Down" in response to circling of the remote controller 420 with an intensity in accordance with a circling amount of the remote controller 420.

At the time of the chapter selection, every time the remote controller 420 is moved by a predetermined moving amount in the right-and-left direction and the upper-and-lower direction, the vibration is generated in predetermined patterns. At the time of the excitement reproduction, on the basis of the excitement levels in a content item, the vibration is generated in the patterns corresponding to the excitement levels in response to the motion of the remote controller 420 to the right or the left. Such information items are output as the condition information items.

As shown in FIG. 15, the control mode is selected by the button operation or the motion operation. The BD recorder 410 transmits a condition information item corresponding to the selected control mode to the remote controller 420 (Steps 401 and 402).

The infrared command corresponding, for example, to the motion operation is transmitted to control the operation of the BD recorder 410 (Steps 403 to 406). With regard to this motion operation, whether or not to generate the vibration is determined on the basis of the condition information item (Steps 407 and 408). When the vibration is generated (Yes in Step 408), the vibration is generated in a pattern corresponding to the condition information item (Yes in Step 408 to Step 410).

Note that, at this time, a vibration table stored in a storage unit 425 of the remote controller 420 may be referred to. In other words, the vibration may be generated with reference to both the vibration-generating-condition information item and the vibration table. As the condition information item, for example, an instruction to generate the vibration in the pattern corresponding to the fast-forward/rewind and by the moving amount is loaded. With reference to the vibration table, specific patterns of the "vibration corresponding to the fast-forward/rewind" and the "vibration by the moving amount" are determined. Such processes also may be executed.

A mapping information item of mapping the vibration-generating-condition information item in a space where the BD recorder 410 is arranged may be generated. The mapping information item is an information item related to X-, Y-, and Z-coordinates in the space. With this, for example, the patterns of the vibration to be generated can be acquired on the basis of a position (X-, Y-, and Z-coordinates) which the remote controller 420 points to, and correspondingly to its change.

For example, the BD recorder 410 outputs the mapping information item to the remote controller 420, the mapping information item containing a coordinate system corresponding to the control mode. The remote controller 420 is capable of detecting the position which the remote controller 420 points to. For example, when the mapping information item to be used corresponds to the chapter selection screen illustrated in FIG. 6, the vibration can be generated in the pattern corresponding to the chapter switching.

In this embodiment, once the vibration-generating-condition information item is initially transmitted, the feedback for generating the vibration is unnecessary. Also on the remote controller 420 side, the vibration is generated on the basis of the initially-received condition information item. Thus, by simple processes, the vibration can be generated in patterns corresponding to the operations of the BD recorder 410.

Other Embodiments

The present technology is not limited to the embodiments described hereinabove, and various other embodiments may be carried out.

The patterns of the tactile sensations to be presented to the user correspondingly to the operations of the control-subject apparatus are not limited. The tactile sensations can be presented by changing, for example, a temperature, a shape, or hardness of the control apparatus. More specifically, the temperature of the control apparatus can be changed by providing a heat source such as a heater to the control apparatus. Alternatively, the temperature of the control apparatus can be controlled by controlling an operation of a cooling mechanism including a fan apparatus.

By providing a shape memory alloy, wires, or the like, for example, to a casing portion of the control apparatus, the shape of the control apparatus can be changed. The hardness of the control apparatus can be adjusted, for example, by controlling a support mechanism provided therein. Alternatively, a material that allows the adjustment of the hardness may be used.

In this way, the "tactile sensations" to be presented by the present technology include not only "kinesthetic sense" being a sensation of receiving a force from an object in contact, but also the heat (temperature) that can be felt from the object, and, for example, the shape and the hardness to be recognized therefrom (it can also be said that shape and hardness are sensations based on the "kinesthetic sense"). In other words, the "tactile sensations" according to the present technology include various sensations that can be felt by contact. In addition, tactile sensations to be felt like illusions, such as a pseudo-tactile sensation, a virtual tactile sensation, and a tactile illusion are also included.

In the description hereinabove, the position, the orientation, the posture, and the motion of the control apparatus are detected as its state, and the control signals corresponding to the detection results thereof are output. Instead, as the state of the control apparatus, only one of the position, the orientation, the posture, and the motion, or only an arbitrary combination thereof may be detected.

Further, as the state of the control apparatus, parameters other than the position, the orientation, the posture, and the motion may be detected. For example, the temperature, the shape, the hardness, or the like of the control apparatus may be detected as the state of the control apparatus, and a control signal corresponding thereto may be output. More specifically, when the control apparatus is warmed by being squeezed or rubbed, a control signal corresponding thereto is output to cause the control-subject apparatus to be operated in response to this control signal. Then, in response to the operation of the control-subject apparatus, the temperature of the control apparatus is controlled. Alternatively, when the shape of the control apparatus is changed, a predetermined control signal is output, and then the shape of the control apparatus is changed correspondingly to a result of the operation. The control may be performed also on the basis of such parameters.

The control-subject apparatus may detect the state of the control apparatus. For example, the control-subject apparatus may determine what kind of motion operation has been input, and then a predetermined operation corresponding to the motion operation is performed. The control-subject apparatus outputs the tactile-sensation-related information item corresponding to the operation. Then, on the basis of this information item, the control apparatus performs the tactile-sensation presentation operation. In order to detect the state of the control apparatus, the control-subject apparatus may use, for example, an imaging apparatus and a sensor apparatus that are capable of detecting the state of the control apparatus. With this, the configuration of the control apparatus can be simplified.

A communication system for outputting the control signals, and a communication system for outputting the tactile-sensation-related information items are not limited to the infrared communication in the description hereinabove. For example, short-range wireless communication such as Bluetooth (trademark), and wireless LAN communication such as WiFi may be used. Further, the control signals and the tactile-sensation-related information items may be output respectively in different communication systems.

The control apparatus and the control-subject apparatus are not limited respectively to the infrared remote controller and the BD recorder that are mentioned as their examples in the description hereinabove. As another example, PDAs (Personal Data Assistants) to which a program (application) according to the present technology is installed, such as a smartphone and a game apparatus, may be used as the control apparatus. Further, arbitrary home-electric appliances such as the television apparatus, a video cassette recorder, a DVD player, a CD player, a stereo component system, an air conditioner, an electric fan, and an illumination apparatus may be used as the control-subject apparatus. The present technology is applicable to remote control of these apparatuses.

At least two of the features described hereinabove according to the present technology may be combined with each other. In other words, various features described in the embodiments may be arbitrarily combined with each other regardless of the embodiment. Further, the various advantages described hereinabove are merely examples, and hence are not limited thereto. Thus, other advantages may be additionally obtained.

Note that, the present technology may also employ the following configurations.

(1) A control system, including:
  a control apparatus; and
  a control-subject apparatus,
  the control-subject apparatus including
  a first execution unit that performs a predetermined operation in response to a control signal output from the control apparatus, and
  a first output unit that outputs a tactile-sensation-related information item relating to the predetermined operation,
  the control apparatus including
  a detection unit that detects a state of the control apparatus,
  a second output unit that outputs the control signal corresponding to the detected state, and
  a second execution unit that performs, on the basis of the tactile-sensation-related information item output from the first output unit, a tactile-sensation presentation operation for presenting a tactile sensation.

(2) The control system according to Item (1), in which the state of the control apparatus includes at least one of
  a position,
  an orientation,
  a posture, or
  a motion of the control apparatus.

(3) The control system according to Item (1) or (2), in which
  the first output unit outputs, as the tactile-sensation-related information item, a result of the predetermined operation that is performed by the control-subject apparatus, and
  the second execution unit performs the tactile-sensation presentation operation for presenting the tactile sensation that corresponds to the output result of the predetermined operation.

(4) The control system according to any one of Items (1) to (3), in which
  the first output unit outputs a presentation timing of the tactile sensation as the tactile-sensation-related information item, and
  the second execution unit performs the tactile-sensation presentation operation on the basis of the output presentation timing.

(5) The control system according to any one of Items (1) to (4), in which
  the first output unit outputs, as the tactile-sensation-related information item, a pattern of the tactile sensation to be presented, and
  the second execution unit performs the tactile-sensation presentation operation on the basis of the output pattern of the tactile sensation.

(6) The control system according to any one of Items (1) to (5), in which
  the first output unit outputs, as the tactile-sensation-related information item, a presentation condition of the tactile sensation, the presentation condition relating to the state of the control apparatus, and
  the second execution unit performs the tactile-sensation presentation operation on the basis of the output presentation condition of the tactile sensation.

(7) The control system according to any one of Items (1) to (6), in which
  the first execution unit performs volume control in response to the control signal, and
  the first output unit outputs the tactile-sensation-related information item that corresponds to the volume control.

(8) The control system according to any one of Items (1) to (7), in which
  the first execution unit performs reproduction control with respect to a content item in response to the control signal, and
  the first output unit outputs the tactile-sensation-related information item that corresponds to the reproduction control.

(9) The control system according to any one of Items (1) to (8), in which
  the first execution unit performs reproduction point selection with respect to a content item in response to the control signal, and
  the first output unit outputs the tactile-sensation-related information item that corresponds to the reproduction point selection.

(10) The control system according to any one of Items (1) to (9), in which
  the first execution unit performs reproduction point selection with respect to a content item in response to the control signal, and
  the first output unit outputs the tactile-sensation-related information item that corresponds to an excitement level in the content item.

(11) The control system according to any one of Items (1) to (10), in which
the first execution unit performs selection of a deletion-target data item in response to the control signal, and
the first output unit outputs the tactile-sensation-related information item that corresponds to an importance of the selected deletion-target data item.

(12) The control system according to any one of Items (1) to (11), in which
the second execution unit determines, on the basis of the detected state, the tactile sensation to be presented.

(13) The control system according to any one of Items (1) to (12), in which
the execution unit causes, as the tactile-sensation presentation operation, the control-subject apparatus to vibrate.

(14) The control system according to any one of Items (1) to (13), in which
the execution unit changes, as the tactile-sensation presentation operation, at least one of
a temperature,
a shape, or
hardness of the control-subject apparatus.

REFERENCE SIGNS LIST 10, 210, 310, 410 BD recorder
12, 212, 312 control unit of BD recorder
20, 220, 320, 420 remote controller
22 operation unit
23 motion detection unit
26 tactile-sensation presentation unit
27 tactile-sensation-information conversion unit
28, 228, 328 control unit of remote controller
100 control system It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A control system, comprising:
a control apparatus; and
a control-subject apparatus,
the control-subject apparatus including
a first execution unit that (i) performs a predetermined operation in response to a control signal output from the control apparatus, and (ii) determines a mapping information item including a set of coordinates corresponding to the predetermined operation, and
a first output unit that outputs (i) a tactile-sensation-related information item relating to the predetermined operation, and (ii) the mapping information item,
the control apparatus including
a detection unit that detects a state of the control apparatus and a position to which the control apparatus points relative to the mapping information item,
a second output unit that outputs the control signal corresponding to the detected state, and
a second execution unit that performs, on a basis of the tactile-sensation-related information item and the mapping information item output from the first output unit, and the detected position to which the control apparatus points, a tactile-sensation presentation operation for presenting a tactile sensation.

2. The control system according to claim 1, wherein
the state of the control apparatus includes at least one of
a position,
an orientation,
a posture, or
a motion of the control apparatus.

3. The control system according to claim 1, wherein
the first output unit outputs, as the tactile-sensation-related information item, a result of the predetermined operation that is performed by the control-subject apparatus, and
the second execution unit performs the tactile-sensation presentation operation for presenting the tactile sensation that corresponds to the output result of the predetermined operation.

4. The control system according to claim 1, wherein
the first output unit outputs a presentation timing of the tactile sensation as the tactile-sensation-related information item, and
the second execution unit performs the tactile-sensation presentation operation on a basis of the output presentation timing.

5. The control system according to claim 1, wherein
the first output unit outputs, as the tactile-sensation-related information item, a pattern of the tactile sensation to be presented, and
the second execution unit performs the tactile-sensation presentation operation on a basis of the output pattern of the tactile sensation.

6. The control system according to claim 1, wherein
the first output unit outputs, as the tactile-sensation-related information item, a presentation condition of the tactile sensation, the presentation condition relating to the state of the control apparatus, and
the second execution unit performs the tactile-sensation presentation operation on a basis of the output presentation condition of the tactile sensation.

7. The control system according to claim 1, wherein
the first execution unit performs volume control in response to the control signal, and
the first output unit outputs the tactile-sensation-related information item that corresponds to the volume control.

8. The control system according to claim 1, wherein
the first execution unit performs reproduction control with respect to a content item in response to the control signal, and
the first output unit outputs the tactile-sensation-related information item that corresponds to the reproduction control with respect to the content item.

9. The control system according to claim 1, wherein
the first execution unit performs reproduction point selection with respect to a content item in response to the control signal, and
the first output unit outputs the tactile-sensation-related information item that corresponds to the reproduction point selection.

10. The control system according to claim 1, wherein
the first execution unit performs reproduction point selection with respect to a content item in response to the control signal, and
the first output unit outputs the tactile-sensation-related information item that corresponds to an excitement level in the content item.

11. The control system according to claim 1, wherein
the first execution unit performs selection of a deletion-target data item in response to the control signal, and
the first output unit outputs the tactile-sensation-related information item that corresponds to an importance of the selected deletion-target data item.

12. The control system according to claim 1, wherein
the second execution unit determines, on a basis of the detected state, the tactile sensation to be presented.

13. The control system according to claim 1, wherein
the second execution unit causes, as the tactile-sensation presentation operation, the control apparatus to vibrate.

14. The control system according to claim 1, wherein
the second execution unit changes, as the tactile-sensation presentation operation, at least one of
a temperature,
a shape, or
hardness of the control apparatus.

15. A control apparatus that is capable of controlling a control-subject apparatus, the control apparatus comprising:
a detection unit that detects a state of the control apparatus and a position to which the control apparatus points relative to a mapping information item including a set of coordinates, the mapping information item determined by the control-subject apparatus;
an output unit that outputs a control signal corresponding to the detected state;
a reception unit that receives (i) a tactile-sensation-related information item relating to a predetermined operation that the control-subject apparatus performs in response to the output control signal, and (ii) the mapping information item, wherein the set of coordinates of the mapping information item correspond to the predetermined operation, and wherein the tactile-sensation-related information item and the mapping information item are output from the control-subject apparatus; and
an execution unit that performs, on a basis of the received tactile-sensation-related information item and the mapping information item, and the detected position to which the control apparatus points, a tactile-sensation presentation operation for presenting a tactile sensation.

16. A control method that is carried out by a control apparatus and a control-subject apparatus, the control method comprising:
outputting, by the control apparatus, a control signal corresponding to a state of the control apparatus;
performing, by the control-subject apparatus, a predetermined operation in response to the control signal output from the control apparatus;
determining, by the control-subject apparatus, a mapping information item including a set of coordinates corresponding to the predetermined operation;
outputting, by the control-subject apparatus, a tactile-sensation-related information item relating to the predetermined operation, and the mapping information item;
detecting, by the control apparatus, a position to which the control apparatus points relative to the mapping information item; and
performing, by the control apparatus, on a basis of the tactile-sensation-related information item and the mapping information item output from the control-subject apparatus, and the detected position to which the control apparatus points, a tactile-sensation presentation operation for presenting a tactile sensation.

* * * * *